United States Patent
Haapanen et al.

(10) Patent No.: US 10,432,747 B2
(45) Date of Patent: Oct. 1, 2019

(54) OFFLINE MOBILE CAPTURE

(71) Applicants: Tom Haapanen, Kitchener (CA); Qinlei Fan, South Pine Brook, NJ (US)

(72) Inventors: Tom Haapanen, Kitchener (CA); Qinlei Fan, South Pine Brook, NJ (US)

(73) Assignee: RICOH COMPANY, LTD., Tokyo (JP)

( * ) Notice: Subject to any disclaimer, the term of this patent is extended or adjusted under 35 U.S.C. 154(b) by 432 days.

(21) Appl. No.: 14/735,251

(22) Filed: Jun. 10, 2015

(65) Prior Publication Data
US 2016/0366240 A1    Dec. 15, 2016

(51) Int. Cl.
| G06F 15/167 | (2006.01) |
| H04L 29/08 | (2006.01) |
| H04N 1/00 | (2006.01) |
| H04N 1/32 | (2006.01) |
| H04L 12/24 | (2006.01) |

(52) U.S. Cl.
CPC .......... *H04L 67/2842* (2013.01); *H04L 41/22* (2013.01); *H04N 1/0097* (2013.01); *H04N 1/00514* (2013.01); *H04N 1/00949* (2013.01); *H04N 1/32122* (2013.01); *H04N 2201/3276* (2013.01)

(58) Field of Classification Search
CPC . H04L 67/2842; H04L 41/22; H04N 1/32122; H04N 1/00949; H04N 1/0097; H04N 1/00514; H04N 2201/3276
See application file for complete search history.

(56) References Cited

U.S. PATENT DOCUMENTS

| 8,891,106 | B1 | 11/2014 | Haapanen |
| 9,489,154 | B1 | 11/2016 | Haapanen et al. |
| 9,516,473 | B1 | 12/2016 | Haapanen et al. |
| 2004/0070613 | A1 | 4/2004 | Sprague et al. |
| 2007/0027895 | A1 | 2/2007 | Bridges et al. |
| 2008/0174819 | A1 | 7/2008 | Hada |
| 2010/0031192 | A1* | 2/2010 | Kong ............... H04N 1/00 715/810 |
| 2010/0157067 | A1 | 6/2010 | Karn et al. |
| 2012/0265865 | A1 | 10/2012 | Tanaka et al. |
| 2012/0266073 | A1* | 10/2012 | Tanaka ............ G06F 11/3013 715/736 |

(Continued)

FOREIGN PATENT DOCUMENTS

| EP | 2150036 A2 | 2/2010 |
| WO | WO2014/178072 A2 | 11/2014 |

OTHER PUBLICATIONS

U.S. Appl. No. 14/965,401, Qinlei Fan Yuuki Ohtaka, Flexible Workflow, Pending.

(Continued)

*Primary Examiner* — Aftab N. Khan
*Assistant Examiner* — Anh Nguyen
(74) *Attorney, Agent, or Firm* — Duft & Bornsen, PC

(57) ABSTRACT

Systems, apparatuses and methodologies to facilitate a capture-to-workflow feature on a terminal apparatus configured to upload captured content along with user specified metadata, via a network to a content management apparatus. Such terminal apparatus configured to enable to perform metadata entry using a cached workflow, even when the terminal apparatus is not connected via the network to the content management apparatus.

15 Claims, 36 Drawing Sheets

(56) References Cited

U.S. PATENT DOCUMENTS

| | | | |
|---|---|---|---|
| 2013/0120785 A1 | 5/2013 | Terao | |
| 2013/0154800 A1* | 6/2013 | Holmes | G06Q 10/06312 |
| | | | 340/10.1 |
| 2014/0029032 A1* | 1/2014 | Hilbert | H04N 1/00307 |
| | | | 358/1.13 |
| 2014/0222980 A1 | 8/2014 | Hagiwara et al. | |
| 2014/0223316 A1 | 8/2014 | Anderson et al. | |
| 2014/0223325 A1 | 8/2014 | Melendez et al. | |
| 2014/0293325 A1 | 10/2014 | Haapanen | |
| 2015/0131118 A1 | 5/2015 | Terao | |
| 2015/0215491 A1* | 7/2015 | Faust | G06F 17/241 |
| | | | 715/780 |
| 2015/0264192 A1 | 9/2015 | Terao | |
| 2016/0063651 A1 | 3/2016 | Kesarwani | |
| 2016/0070684 A1 | 3/2016 | Kesarwani | |
| 2016/0080306 A1 | 3/2016 | Kesarwani | |
| 2016/0134766 A1 | 5/2016 | Terao | |
| 2016/0164846 A1* | 6/2016 | Casler | H04W 12/08 |
| | | | 726/4 |

OTHER PUBLICATIONS

U.S. Appl. No. 14/926,978, Tom Haapanen Matt Cecile, System, Apparatus and Method for Secure Operation of Image Forming Device, Pending.

U.S. Appl. No. 14/934,093, Tom Haapanen Matt Cecile, System, Apparatus and Method for Tracking and Managing Devices, U.S. Pat. No. 9,489,154.

U.S. Appl. No. 15/042,731, Qinlei Fan, System, Apparatus and Method to Process Documents According to Document Processing Profile, Pending.

U.S. Appl. No. 15/044,561, Qinlei Fan, System, Apparatus and Method for Document Processing Including Document Stamping, Pending.

U.S. Appl. No. 15/015,619, Tom Haapanen Matt Cecile, System, Apparatus and Method for Easy Access to Casual or Guest Printing, Pending.

U.S. Appl. No. 15/090,510, Tom Haapanen Matt Cecile, Locating and Tracking Missing or Relocated Devices, Pending.

U.S. Appl. No. 15/088,901, Tom Haapanen, System, Apparatus and Method Configured to Detect, Analyze and/or Report Impact to Output Device, Pending.

U.S. Appl. No. 15/090,124, Tom Haapanen Matt Cecile, Device Management Based on Tracking Path Taken by User, U.S. Pat. No. 9,516,473.

U.S. Appl. No. 15/166,193, Tom Haapanen Tom Mulholland, Configuring Devices Using Device Management Templates, Pending.

U.S. Appl. No. 14/965,401 of Qinlei Fan et al. filed Dec. 10, 2015.

U.S. Appl. No. 14/926,978 of Tom Haapanen et al. filed Oct. 29, 2015.

U.S. Appl. No. 15/042,731 of Qinlei Fan filed Feb. 12, 2016.

U.S. Appl. No. 15/044,561 of Qinlei Fan filed Feb. 16, 2016.

U.S. Appl. No. 15/015,619 of Tom Haapanen et al. filed Feb. 4, 2016.

U.S. Appl. No. 15/090,510 of Tom Haapanen et al. filed Apr. 4, 2016.

U.S. Appl. No. 15/088,901 of Tom Haapanen filed Apr. 1, 2016.

U.S. Appl. No. 15/166,193 of Tom Haapanen et al. filed May 26, 2016.

European Search Report official action dated Nov. 14, 2016 in corresponding.

European Patent Application No. 16170615.5.

U.S. Appl. No. 13/086,608, Shun Tanaka Tom Haapanen Jim Vopni, Device Management System, Pending (US 2012/0265865 A1).

U.S. Appl. No. 13/086,779, Shun Tanaka Tom Haapanen Jim Vopni, Device Management System Including Reporting Server, Pending (US 2012/0266073 A1).

U.S. Appl. No. 13/758,082, Kenji Hagiwara Tom Haapanen Arturo Hung Tse, Device Management Apparatus, System and Method Including Remote Configuration of Device Preference Settings, Pending (US 2014/0222980 A1).

U.S. Appl. No. 13/758,116, Greg Melendez Tom Haapanen, Dynamic User Interface for Device Management System, Pending (US 2014/0223325 A1).

U.S. Appl. No. 13/758,110, Greg Anderson Tom Haapanen Kenji Hagiwara, Device Management System, Apparatus and Method Configured for Customizing a Power Filter, Pending (US 2014/0223316 A1).

U.S. Appl. No. 13/855,083, Tom Haapanen, Click-To-Print System, Apparatus and Method, Pending (US 2014/0293325 A1).

U.S. Appl. No. 13/924,798, Tom Haapanen, Access Control System and Method for Mobile Printing, (U.S. Pat. No. 8,891,106).

* cited by examiner

| Workflow | Metadata Field Screens |
|---|---|
| Area 5: Red Elephant Nest | Screen 1, Screen 2, Screen 3, Screen 4 |
| Employee Evaluation | Screen 1, Screen 2, Screen 3, |
| Plant Based Medicine | Screen 1 |
| Legal Advice | Screen 2, Screen 4 |

| Document | Associated Workflow | Metadata Fields |
|---|---|---|
| Strange Red Elephant.jpeg | Area 5: Red Elephant Nest | Project Name: Rainforest Based Pharmaceutical Research<br><br>Document Category: Photographs<br><br>Author: Marcel Cousteau<br><br>Document Creation Date: May 20, 2015 (11:30 AM)<br><br>Description: (Here is a photograph that I have taken of an adult red elephant which, peculiarly has ears that are 30% larger than other red elephants |
| Wild Bunny.pdf | Hidden Garden | Project Code: B-404 |

OFFLINE MOBILE CAPTURE

TECHNICAL FIELD

This disclosure relates to systems, apparatuses and methodologies, for entry of metadata to be associated with captured content, and more specifically, to such systems, apparatuses and methodologies to facilitate a workflow for metadata entry that can be repeated for plural content items.

BACKGROUND

In the current information age, information technology tools play a significant role in our daily activities, and the trend is that more and more tasks involve use of information technology (IT) and digital media. Information technology tools such as scanners and multi-function printers (MFP) are utilized to convert hardcopy documents into electronic form, thereby decreasing the need for physical storage space and at the same time allowing the information in the paper documents to be transmitted quickly and more readily.

Further, due to the proliferation of IT and other technologies, as well as changes in our society to ever higher levels of mobility, expectations of access to information while on-the-go is becoming part of the current day culture. Consequently, virtually every individual in our society carries one or more mobile devices (such as tablet or notebook computers, smartphones and other handsets with a display, etc.) to facilitate such access.

The ever more sophisticated mobile devices allow users to access information via any of various media. For example, e-mail and messaging are popular means to communicate information, such as when an oral conversation is not possible, convenient, suitable, etc., as well as in other circumstances. Further, the web provides a whole world of available content and information. In addition, software applications running on the mobile devices may allow the user to access content or information through the Internet and/or another data network.

With the proliferation of content access via digital means, content management applications are now available that allow the user to use a mobile device to capture content (e.g., take a photo, convert web content to document, convert e-mail to document, download an attachment to an e-mail, convert voice input to document, etc.) and upload such captured content via a network to a content management apparatus. Further, the user may wish to enter some annotations in connection with the captured content and then have such annotations associated and stored with the captured content.

However, when a conventional content management apparatus additionally has a content-to-capture workflow feature, such feature is available to the user terminal only if the user terminal is connected to the content management apparatus. That is, there may be circumstances when the user terminal does not have a network connection and/or the content management apparatus is not available (such as due to high traffic).

There is a need for an improved approach that streamlines registration of metadata in connection with captured content in a mobile context.

SUMMARY

Various tools (for example, a system, an apparatus, application software, a process, etc.) can be provided to enhance metadata registration workflow, such as to facilitate a capture-to-workflow feature on a terminal apparatus that is configured to upload captured content along with user specified metadata, via a network to a content management apparatus. Such tools may be embedded in a mobile application that provides a user interface to specify content and/or capture content images (e.g., photos, scanned documents, converted electronic document images, etc.) and enter metadata, such as through a series of steps or user interface screens, to augment the captured images for categorization, annotation and future retrieval, and then submit them to a content management solution and/or send them to fax or email recipients. The tools can provide an avenue for capture of content images and metadata, even when there is no network access and/or no connection to the content management server (or other content management apparatus).

For example, the application can be configured to cache key information (that can specify a workflow) after each successful login. When offline (i.e. no network access and/or no connection to the content management apparatus), this information is used to determine what metadata can be captured without interaction with the content management apparatus. When the user terminal later connects to the content management apparatus and the user logs into the application, the user may be presented with a user interface to submit the offline documents and/or other content images. Further, the user interface may additionally request the user to validate the offline entries (i.e. content and/or metadata) and the user can edit or correct them before the documents are uploaded to the content management apparatus.

Various other aspects may be included in the mobile application to enable the user to continue to capture photos and associated metadata while not connected to a network and/or not connected to the content management apparatus. For example, in the case that the content management apparatus has a capture-to-workflow feature, the mobile application can be configured to cache workflows and, upon every successful login, refresh its cache of workflows locally and/or synchronize the cache of workflows with those registered by the content management apparatus (in association with the user, or with a user group or work group, or with users at large). When a workflow is selected which has screens for metadata entry, identification of such screens can be cached and saved in local storage as well.

In another aspect, after the user captures photos or other content images while having no connection to the content management apparatus and/or no network access, a list of cached workflows can be displayed and the user may be permitted to select a workflow from the list. In a case that the selected workflow has metadata screens cached locally, such screen can be presented for index data entry and the entered metadata can be saved locally in association with the workflow and/or as a new workflow.

In another aspect, when the user terminal connects online (i.e. to the content management apparatus via a network) and the user successfully logs into the mobile application, the user can be prompted to submit offline workflows. If the user declines at such initial login time, the user interface can be configured to periodically or at least intermittently provide, for example, a button, a menu choice, etc., to permit the user to specify the instruction to submit the offline (i.e. cached) documents and/or workflows. Further, when submitting the offline documents, the user may be provided the option of confirming all documents as they are submitted or only being shown error conditions.

The tools may include other aspects. For example, a workflow cached locally by the mobile application may be a series of user interface screens (or identifications of such screens), and the screens may be filled in using the captured metadata that was cached (i.e. stored locally), before being submitted. As another example, if a workflow fails to be submitted due to errors or incompleteness, the user can be provided with an opportunity to edit it and then try to submit again, or cancel it. When editing a selected workflow, the workflow presented for review and editing can be pre-filled with cached values that were gathered while offline.

In addition, the mobile application may be configured to enable submission of workflows that are completed without further input from the user. For example, a system administrator can configure the workflows to use predetermined metadata for required fields and/or set up default values for the workflow.

BRIEF DESCRIPTION OF THE DRAWINGS

The aforementioned and other aspects, features and advantages can be more readily understood from the following detailed description with reference to the accompanying drawings wherein:

FIG. 4 shows an example of workflow data cached by the content capture application, or registered by content management apparatus;

FIG. 5 shows an example of document data cached by the content capture application, or registered by content management apparatus;

DETAILED DESCRIPTION

Figure 1:
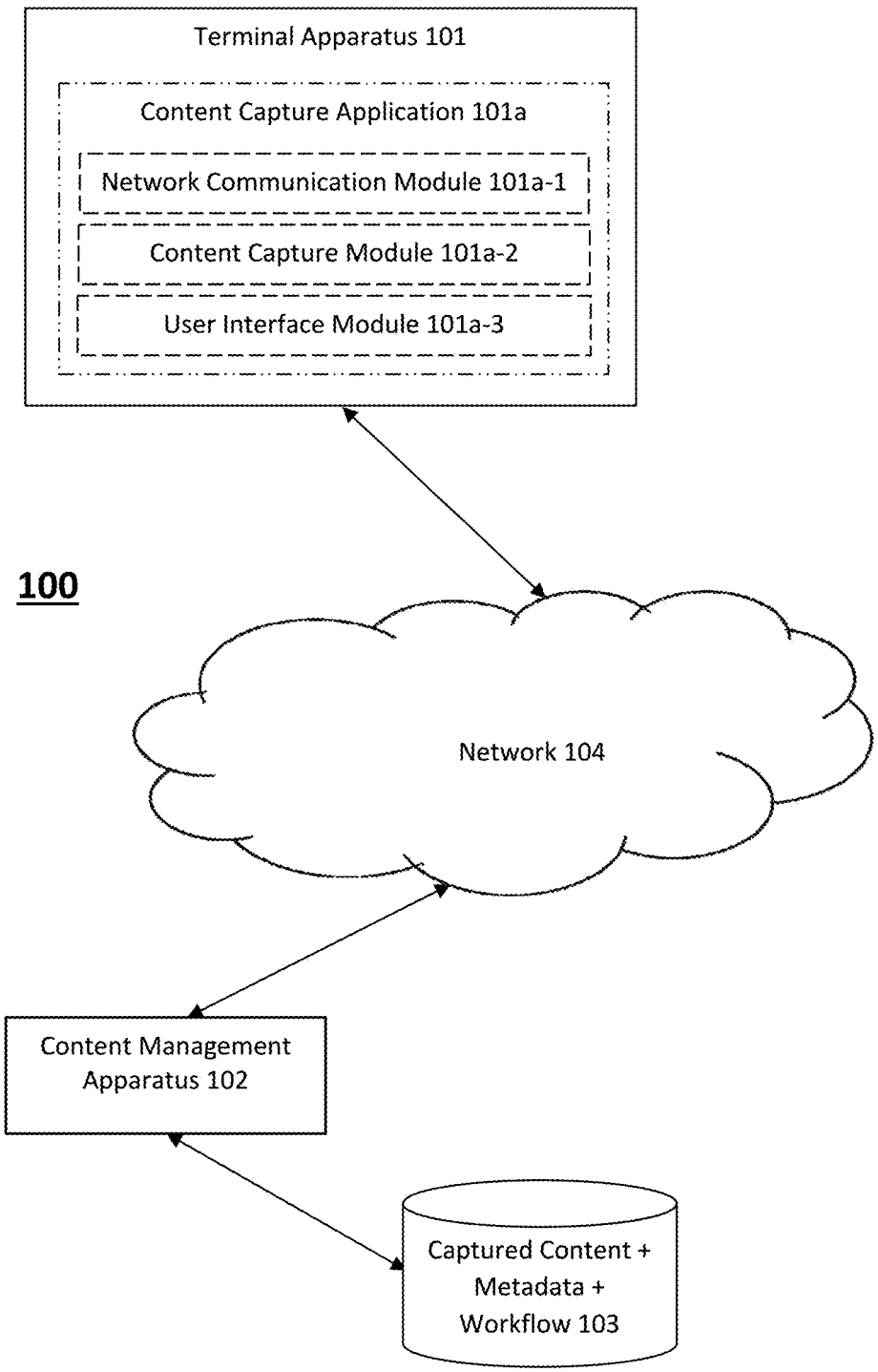
FIG. 1 shows a block diagram of a system in which a terminal apparatus configured with a content capture application can upload captured content along with metadata, as well as workflows, via a network to a content management apparatus, if the terminal is connected to the content management apparatus, or caches the captured content, metadata and workflows while the terminal apparatus is not connected to the content management apparatus, according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Various tools are discussed herein to facilitate content capture in a mobile context, such as metadata entry workflow on a mobile terminal when a content capture application on the terminal is offline. It should be appreciated by those skilled in the art that any one or more of such tools may be embedded in the mobile application and/or in any of various other ways and thus while various examples are discussed herein, the inventive subject matter of this disclosure is not limited to such examples described herein.

Referring now to the drawings, wherein like reference numerals designate identical or corresponding parts throughout the several views, FIG. 1 shows schematically a system 100 that includes a terminal apparatus 101, content management apparatus 102 and a database 103 registering captured content, metadata and workflow (CCMW). The terminal apparatus 101 and the content management apparatus 102 are interconnected by a network 104.

The terminal apparatus 101 can be any computing device, including but not limited to a tablet or notebook computer, a PDA (personal digital assistant), a mobile phone or handset, another mobile information terminal, etc., that can communicate with other devices through the network 103.

The terminal apparatus 101 may be configured to have thereon any of various application software, such as a content capture application 101a which includes a network communication module 101a-1, a content capture module 101a-2 and a user interface module 101a-3.

The network communication module 101a-1 communicates with different devices connected to network 104. For example, the network communication module 101a-1 may communicate with the content management apparatus 102 in order to upload files (e.g., images, etc.) apparatus 102 thereby creating more space for files to be stored on the terminal apparatus 101. In addition, the network communication module 101a-1 may also download files or updates from the content management apparatus 102. Such communication may be performed (for example, by way of an Ethernet connection or other network connection which supports any desired network protocol such as, but not limited to TCP/IP, IPX, IPX/SPX, NetBEUI, etc.).

The content capture module 101a-2 captures content indicated by a user as a content image. For example, the content capture module 101a-2 may be connected to a camera or camera application that is integrated with or connected to the terminal 101. The user may utilize the content capture module 101a-2 to obtain images or videos (including sound and visuals) from the camera (or application) and store such images and videos onto the terminal 101 for later access. Thus, the content capture module 101a-2 may provide a connection between the camera of the terminal 101 and the content capture application 101a. The content capture module 101a-2 may receive an image from the camera automatically (or in response to a request from the user) and send such image to the user interface module 101a-3 to be displayed to the user. In an exemplary embodiment, the content capture module 101a-2 may also capture various other files (e.g., .doc, .ppt, .xls, .pdf, .djvu, .mp3, .wmv, etc.) that are already stored on the terminal apparatus 101 (or downloaded from the Internet) as content images of a specified or predetermined format. The content capture module may include, or integrate with, one or more conventional format converters to convert source content in one format to content image of another format (e.g., .doc into .pdf, .tif to .jpg, etc.).

The user interface module 101a-3 provides a graphic user interface (GUI) for the user to perform actions on the terminal 101. For example, the user interface module 101a-3 may present to the user a login screen in which the user can input his or her credentials to access the content management apparatus 102. In another example, the user interface module 101a-3 may allow the user to access functions of the content capture module 101a-2 to capture content images (e.g., .jpeg, .tiff, .png, .bmp, .gif, etc.) and select which of the captured content images to be stored onto the terminal 101. Further, the user interface module 101a-3 may also provide the user with a series of screens (i.e. workflow) from which the user may select or input metadata to be associated with (a) content images captured by the content capture module 101a-2 or (b) various files (e.g., .doc, .ppt, .xls, .pdf, .djvu, .mp3, .wmv, etc.) stored on the terminal 101. Metadata, may be, for example, data which describes data. In other words, metadata may not be displayed to the user when he or she opens a file but is accessed by other means (e.g., command-line interface) in order to view characteristics or properties of the file. For example, the primary purpose of an electronic newspaper article is to display the text of the article. Data describing the electronic newspaper article (e.g., date that the file was created, author, category, country of origin, etc.) may not be displayed with the text itself. To access the metadata describing the article, the user may, for example, use a command-line interface or a program on the operating system (OS) of the terminal to view the metadata describing the electronic newspaper article.

After the user has completed the workflow by successfully inputting at least one metadata field to be associated with the content images or files, the workflow may be saved by the user. Thus, in the case that the user wishes to utilize the workflow again for another content image or file, he or she can access the saved workflow and associate such saved workflow with said another content image or file. As a result, when the user wants to associate the same (or similar) metadata to multiple content images or files, he or she can easily and quickly do so with the saved workflow. For example, the user interface module 101a-3 may present a screen displaying a list of saved workflows stored on the terminal apparatus 101 to the user. The user can select any one of the saved workflows to associate metadata with a content image or file selected by the user. In addition, it should be noted that the terminal apparatus 101 of the user is not required to be connected to a network (e.g., Internet) or to another device (e.g., content management apparatus 102) in order to create, save or update workflows. In other words, in the case that the terminal apparatus 101 is not connected to a network or another device, the user can still create a new workflow or modify an existing one. The workflows created and saved by the user are then stored in the terminal apparatus 101. When the terminal apparatus 101 is connected to a network or another device, the user may be prompted by the content capture application 101a to upload one or more of the saved workflows on the terminal apparatus 101 to a designated location. For example, such designated location can be the content management apparatus 102 which may store workflows created by the user in the CCMW database 103 or in a storage device (e.g., hard-disc drive) disposed of in the content management apparatus 102. This permits the terminal apparatus 101 to clear (or reduce) its storage space. It should also be noted that the user is not required to upload the one or more saved workflows. He or she can store them on the terminal apparatus 101. Further, the user is allowed to upload a portion of the saved workflows while keeping the remaining portion in the terminal apparatus 101. Likewise, the user does not need to upload any saved workflows at all.

The content management apparatus 102 store files (e.g., images, videos, documents, etc.) uploaded from the terminal apparatus 101 on a storage device that may be connected to or internal to the content management apparatus 102. For example, the content management apparatus 102 may store one or more workflows created by the user on the terminal apparatus 101. To facilitate this storing of workflows, the user of the terminal apparatus 102 may first access the content management apparatus 102 by inputting user credentials into the content capture application 101 via the user interface module 101a-3. Once the content capture application 101 authenticates the user, the terminal apparatus 101 attempts to communicate with the content management apparatus 102 (assuming that the terminal apparatus 101 and the content management apparatus are both connected to a network). In the case that communication is successful, the user may be prompted by the content capture application 101a via the user interface module 101a-3 to upload saved workflows (that have not yet been stored on or uploaded to the content management apparatus 102) to the content management apparatus 102. In addition, it should be noted that the user can also download any workflows that are stored on the content management apparatus 102. Such workflows on the content management apparatus 102 may not need to have been created by the user. For example, a portion of the workflows stored on the content management apparatus 102 may have been created by an administrator. In another example, another portion of the workflows stored on the content management apparatus 102 may have been created by other users. In other words, the user is not confined to using his or her own workflows. The user can access other workflows stored on the content management apparatus 102, so long as he or she has access (i.e. permission) to use them. Further, it should also be noted that the content management apparatus 102 is not limited to storing workflows as files (e.g., .doc, .ppt, .xls, .pdf, .djvu, .mp3, .wmv, .jpeg, .tiff, .png, .bmp, .gif, etc.) along with their corresponding metadata can also be uploaded to the content management apparatus 102.

The CCMW database 103 is a database that may be externally connected to or located within the content management apparatus 102. Whenever the user of the terminal apparatus 101 uploads content images, workflows or metadata, the content management apparatus 102 stores them into the CCMW database 103.

The network 104 can be a local area network, a wide area network or any type of network such as an intranet, an extranet (for example, to provide controlled access to external users, for example through the Internet), a private or public cloud network, the Internet, etc., or a combination thereof. In addition, the network 104 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 2:
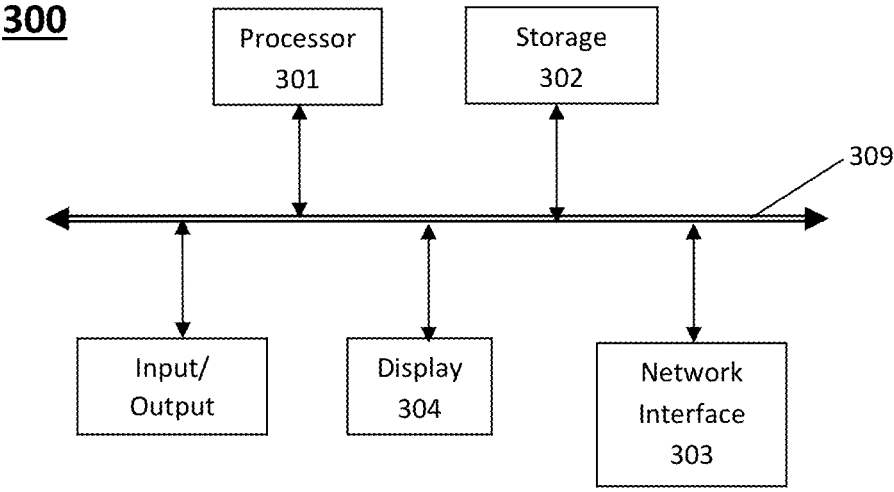
FIG. 2 shows a block diagram of an exemplary configuration of a computing device that can be configured by software to constitute a content management apparatus (such as referenced in FIG. 1)

FIG. 2 shows an exemplary constitution of a computing device that can be configured (for example, through software) to operate (at least in part) as the content management apparatus 102 of FIG. 1. As shown in FIG. 2, apparatus 300 includes a processor (or central processing unit) 301 that communicates with a number of other components, including memory or storage part 302, network interface 303, display 304 and other input/output (e.g., keyboard, mouse, etc.) 305, by way of a system bus 309. The apparatus 300 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In the management apparatus 300, the processor 301 executes program code instructions that control device operations. The processor 301, memory/storage 302, network interface 303, display 304 and input/output 305 are conventional, and therefore in order to avoid obfuscating the inventive aspects of this disclosure, such conventional aspects will not be discussed in detail herein.

The management apparatus 300 includes the network interface 303 for communications through a network, such as communications through the network 103 with the terminal apparatus 101 in FIG. 1. However, it should be appreciated that the subject matter of this disclosure is not limited to such configuration. For example, the apparatus 300 may communicate with client terminals through direct connections and/or through a network to which some components are not connected. As another example, the apparatus 300 does not need to be provided by a server that services terminals, but rather may communicate with the devices on a peer basis, or in another fashion.

The apparatus 300 of the present disclosure is not limited to a server or computer, but can be manifested in any of various devices that can be configured to communicate over a network and/or the Internet.

Figure 3:
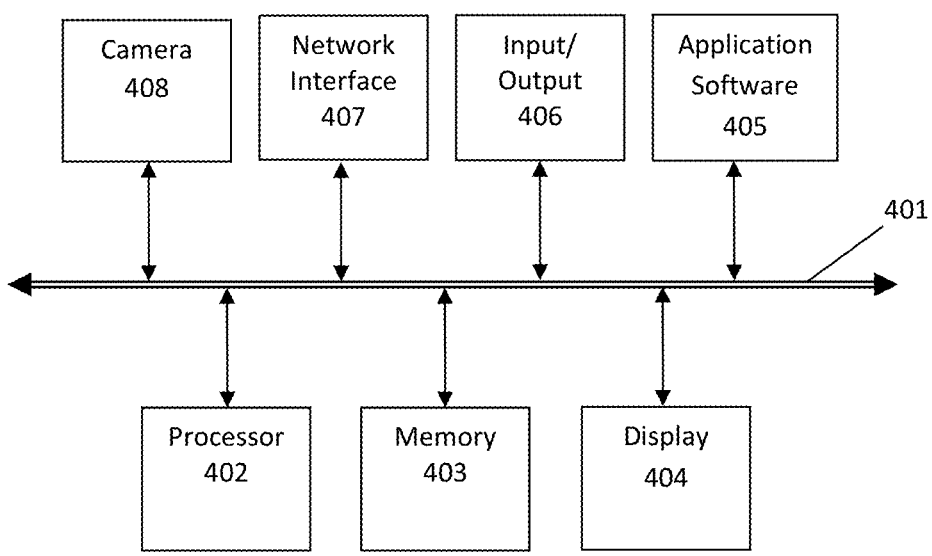
FIG. 3 shows a block diagram of an exemplary configuration of a terminal that can constitute a terminal apparatus.

An exemplary constitution of the terminal apparatus 101 of FIG. 1 (for example, as a computer) is shown schematically in FIG. 3. In FIG. 3, computer 400 includes a processor (or central processing unit) 402 that communicates with a number of other components, including memory 403, display 404, application software 405, input/output (such as keyboard, mouse, touchpad, stylus, microphone and/or speaker with voice/speech interface and/or recognition software, etc.) 406, network interface 407 and camera 408, by way of an internal bus 401.

The memory 403 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 407 provides a connection (for example, by way of an Ethernet connection or other network connection which supports any desired network protocol such as, but not limited to TCP/IP, IPX, IPX/SPX, NetBEUI, etc.) to the network to which the computer 400 is connected (e.g., network 104 of FIG. 1). When the computer 400 is employed as the terminal apparatus 101, the network communication module 101a-1 of the content capture application 101a operates in an integrated manner (such as through the hooks provided by the native operating system of the terminal apparatus 101) with the network interface 407 to communicate with the content management apparatus 102.

The camera 408 is, for example, a digital camera including a series of lenses, an image sensor for converting an optical image into an electrical signal, an image processor for processing the electrical signal into a color corrected image in a standard image file format, and a storage medium for storing the processed images. The series of lenses focus light onto the sensor [e.g. a semiconductor device such as a charge-coupled device (CCD) image sensor or a complementary metal-oxide-semiconductor (CMOS) active pixel sensor] to generate an electrical signal corresponding to an image of a scene. The image processor then breaks down the electronic information into digital data, creating an image in a digital format. The created image is stored in the storage medium (e.g. a hard disk or a portable memory card). The camera 408 may also include a variety of other functionalities such as optical or digital zooming, auto focusing and HDR (High Dynamic Range) imaging.

Additional aspects or components of the computer 400 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

FIG. 4 shows an example of a table managed by a device database (e.g., CCMW 103) which includes various types of workflows along with their corresponding metadata fields. For example, one set of metadata field (e.g., Project Name, Author, Document Category) may be associated with a particular screen (e.g., Screen 1). On the other hand, another set of metadata field (e.g., Document Creation Date, Description) may be associated with another particular screen (e.g., Screen 2). Thus, when a user creates a workflow, the user selects particular screens. Such screens can be in any order and the user is not limited to using only one or all of the screens. In other words, the user may use as many screen as he or she wishes.

FIG. 5 shows an example of a table managed by a device database (e.g., CCMW 103) which includes various types of documents (e.g., "Strange Red Elephant.jpeg) along with the workflow (e.g., "Area 5: Red Elephant Nest") that each document is associated with and the corresponding metadata.

Figure 6A:
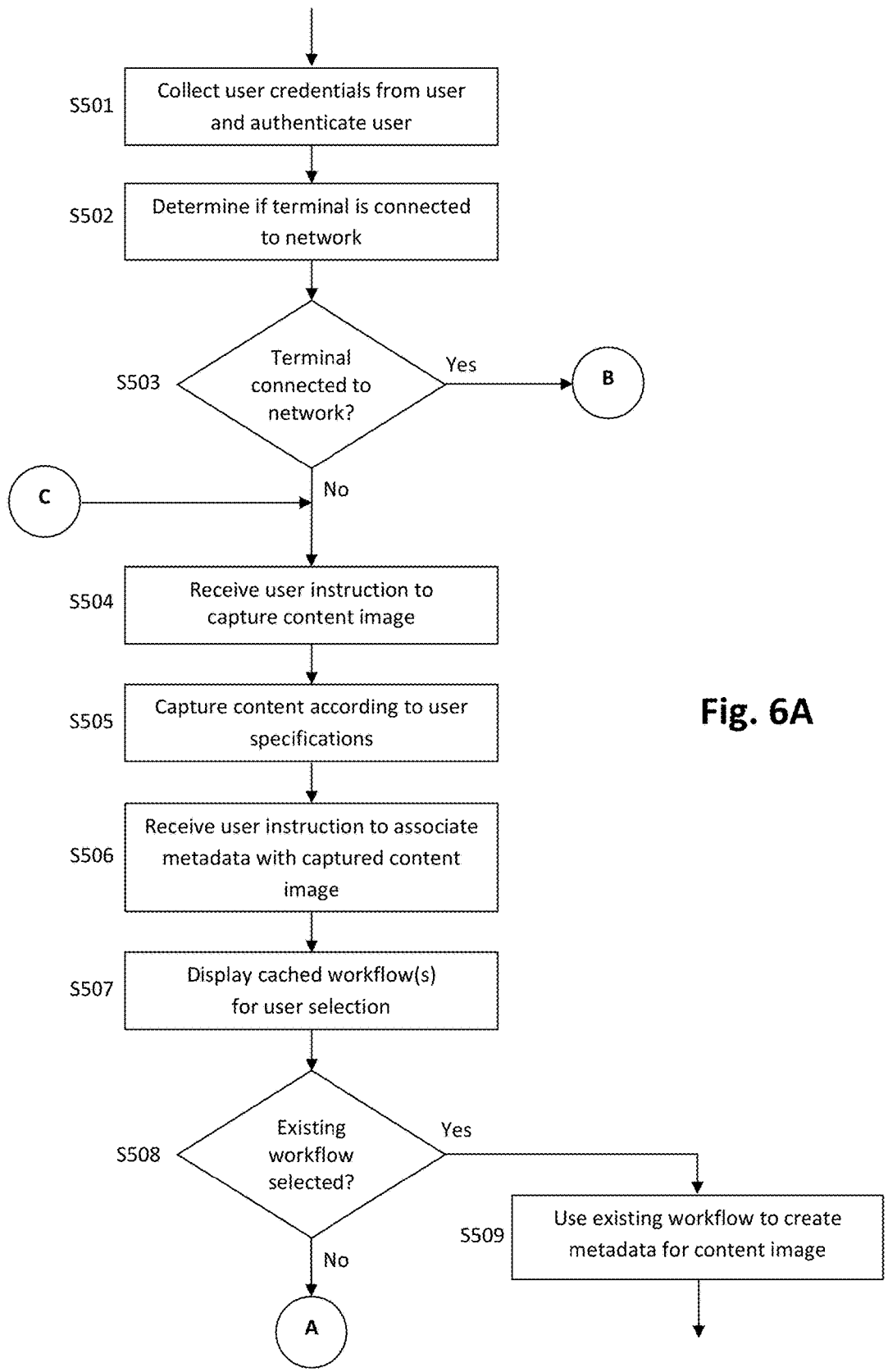
FIGS. 6A-6C show a flow diagram of a method or process performed via a content capture application, such as shown in FIG. 1, according to an exemplary embodiment.
Figure 6B:
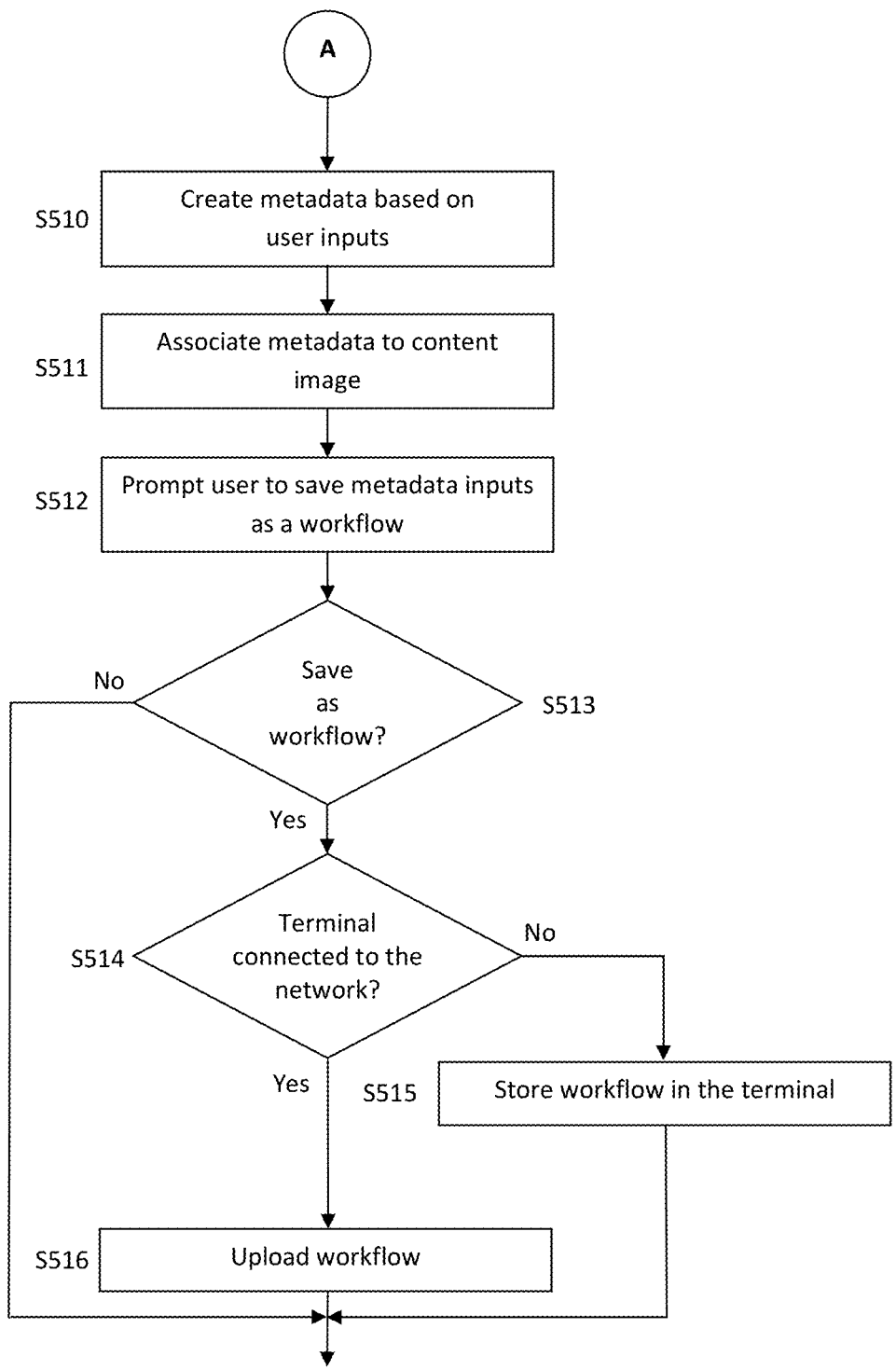
Figure 6C:
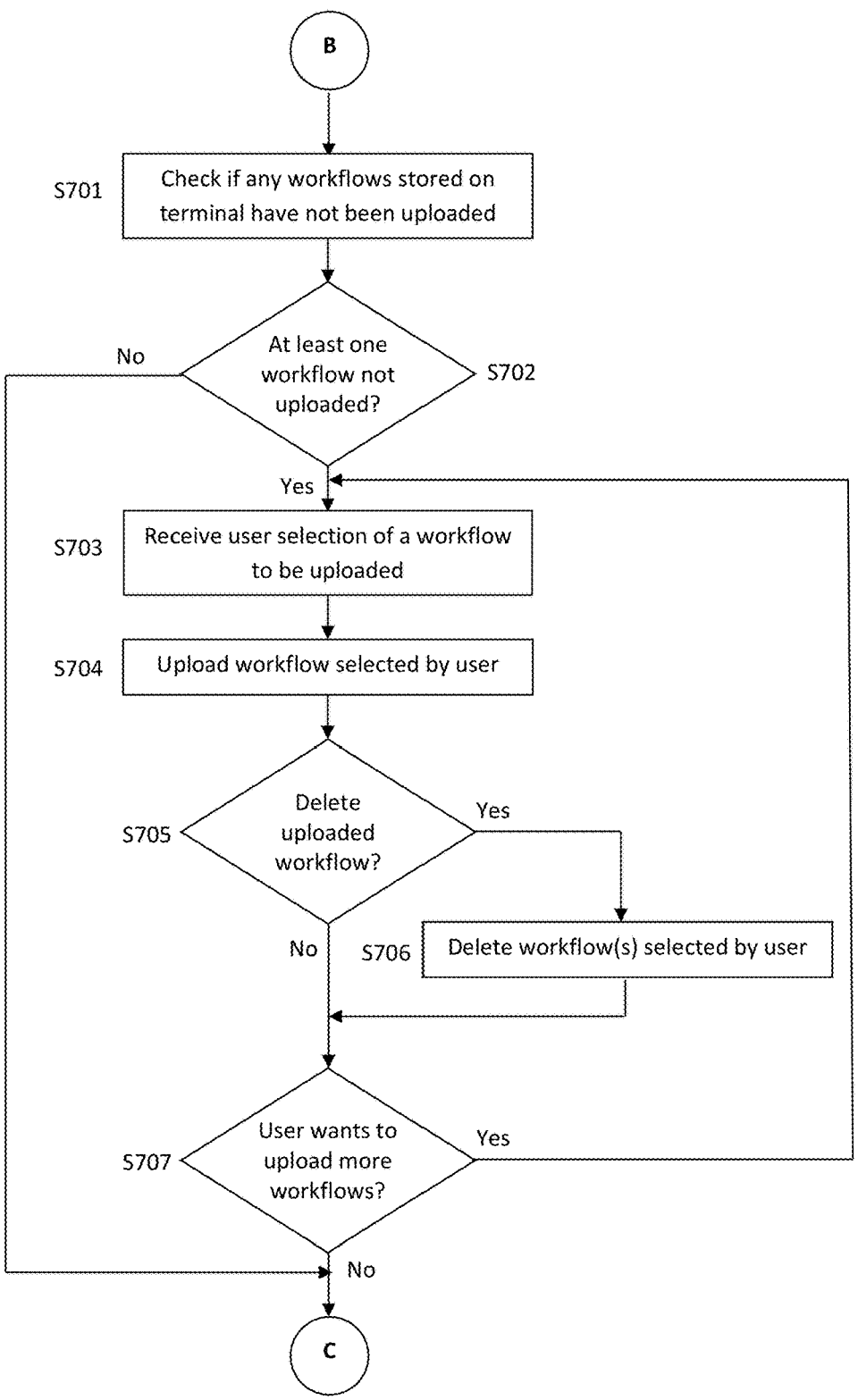

FIGS. 6A-6C show a process or method performed by a content capture application (e.g., 101a) on a terminal apparatus (e.g., 101), according to an exemplary embodiment. In an example of a workflow discussed below with reference to FIGS. 7A-7O a user ("Marcel Cousteau") may be a scientist performing research for developing medicine made from wildlife in protected remote rainforests ("Quebec Tropical Rainforest"). While carrying out the research, the user may be utilizing a terminal apparatus to perform various tasks such as taking photographs of the wildlife with a camera integrated with the terminal apparatus or creating documents pertaining to data obtained in the field. However, while inside the rainforest, the terminal apparatus that the user is utilizing may not be able to communicate to any type of network (e.g., Internet) or any type of device (e.g., servers). This may be due to a variety of reasons. For example, the rain forest's location may be too far from the nearest access point/cell tower or the signals may be unable to propagate due to the thick trees. Nevertheless, the user cannot upload/ download any photographs or files to/from a server (e.g., content management apparatus 102). However, despite the lack of communication with a network, the user can still associate files on his terminal apparatus with metadata and create or access workflows on his terminal apparatus as well (unlike in conventional systems in which the user must always be connected to the internet in order to associate metadata with files).

Figure 7A:
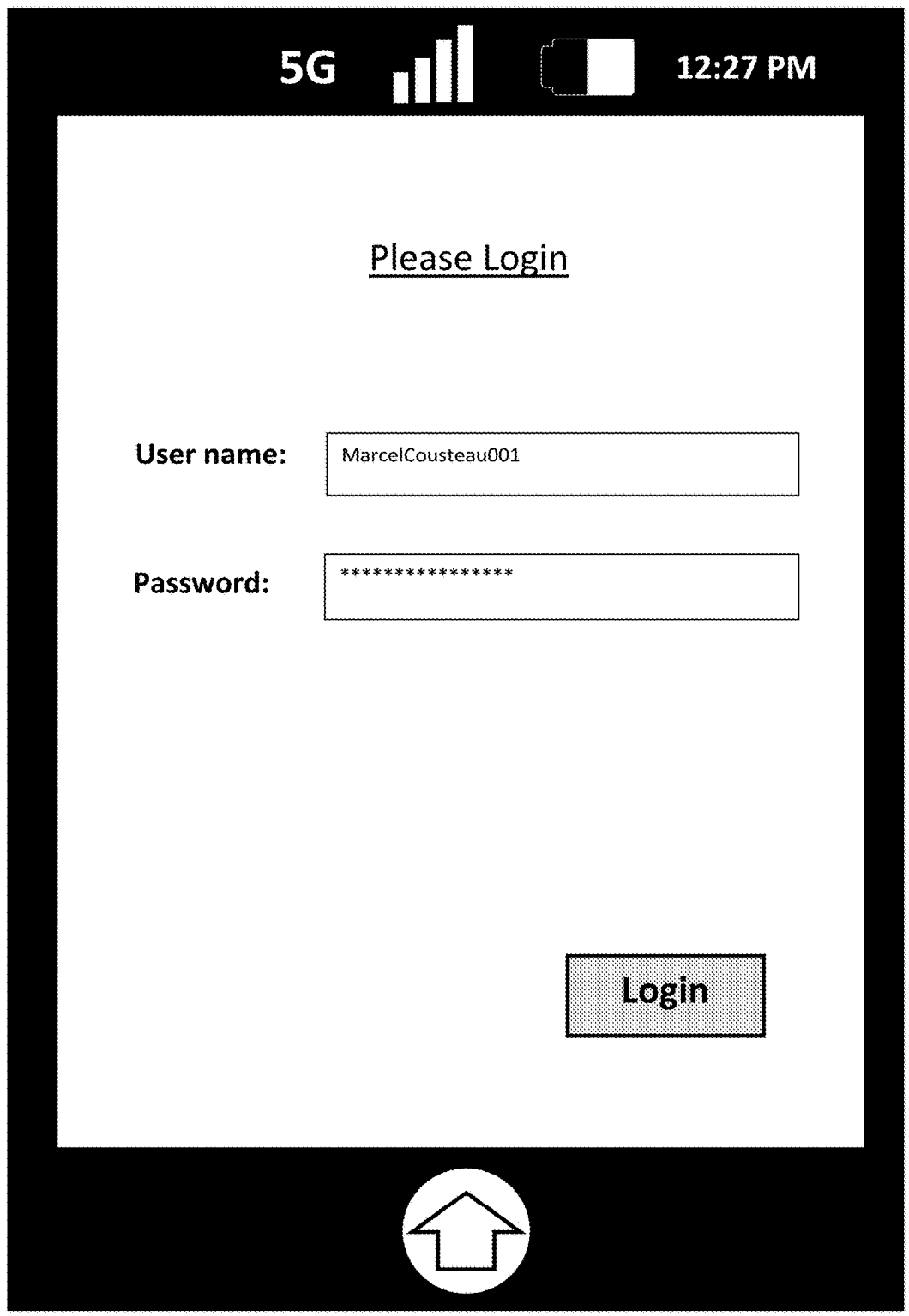
FIGS. 7A-7O show examples of user interface screens that can be provided by a user interface module of a content capture application, such as shown in FIG. 1, according to an exemplary embodiment.

In such process, the content capture application provides a graphic user interface (GUI), such as shown in FIG. 7A, to prompt the user to input user credentials. After receiving the user credentials from the user, the content capture application authenticates the user (step S501). The user credentials may include a username and password. For example, the user may input the username and password via an onscreen keyboard. In another example, the user may alternatively use his or her voice (e.g., voice recognition) for inputting the user credentials. It should be noted that the user may also be presented with other alternative options such as fingerprint reading or retina scanning for inputting user credentials.

Figure 7B:
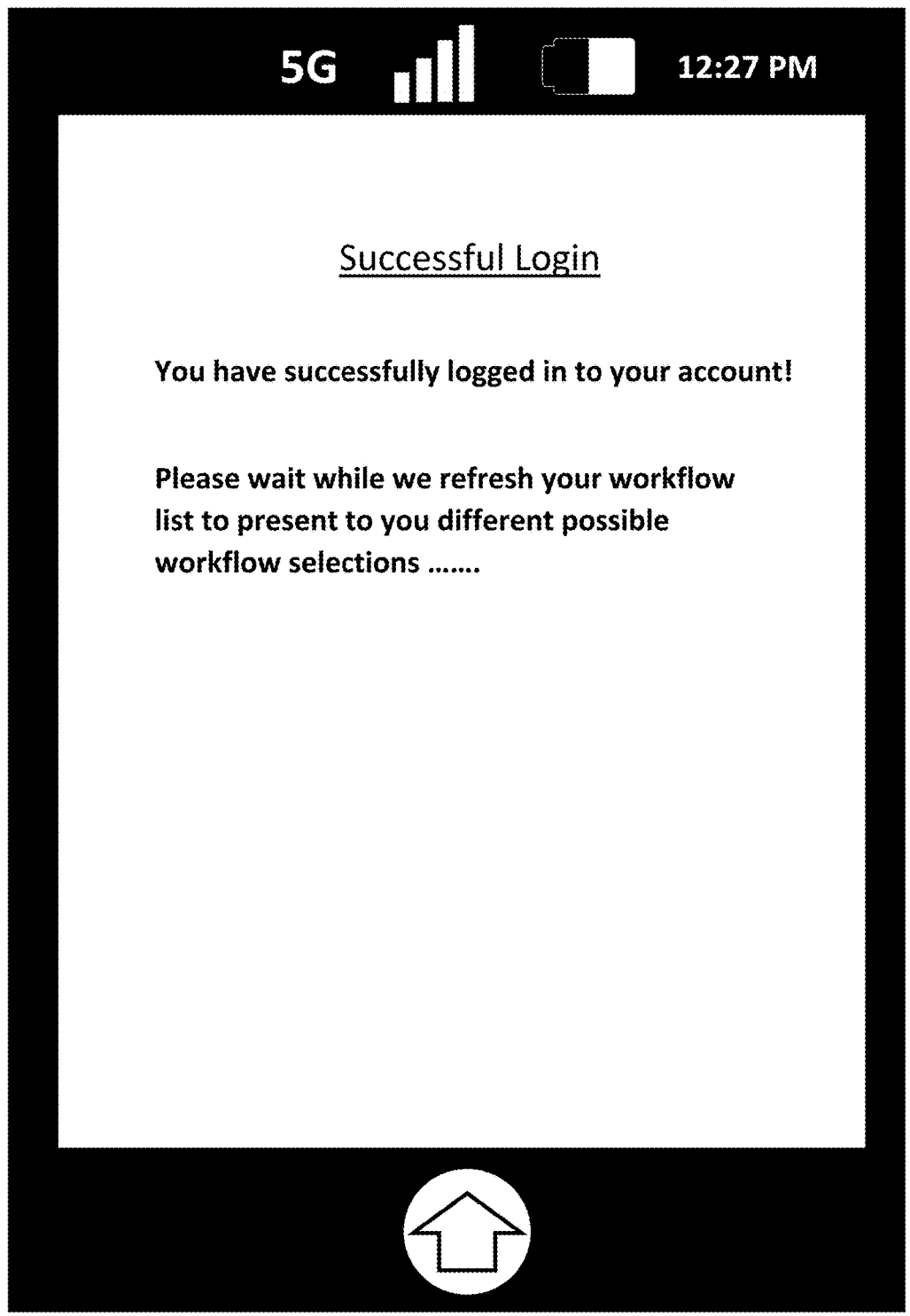

After receiving the user is authenticated, the content capture application notifies the user that user login has been authenticated and may provide an additional message, such as shown in FIG. 7B, as the application attempts to connect to a content management apparatus via a network (S502).

Figure 7C:
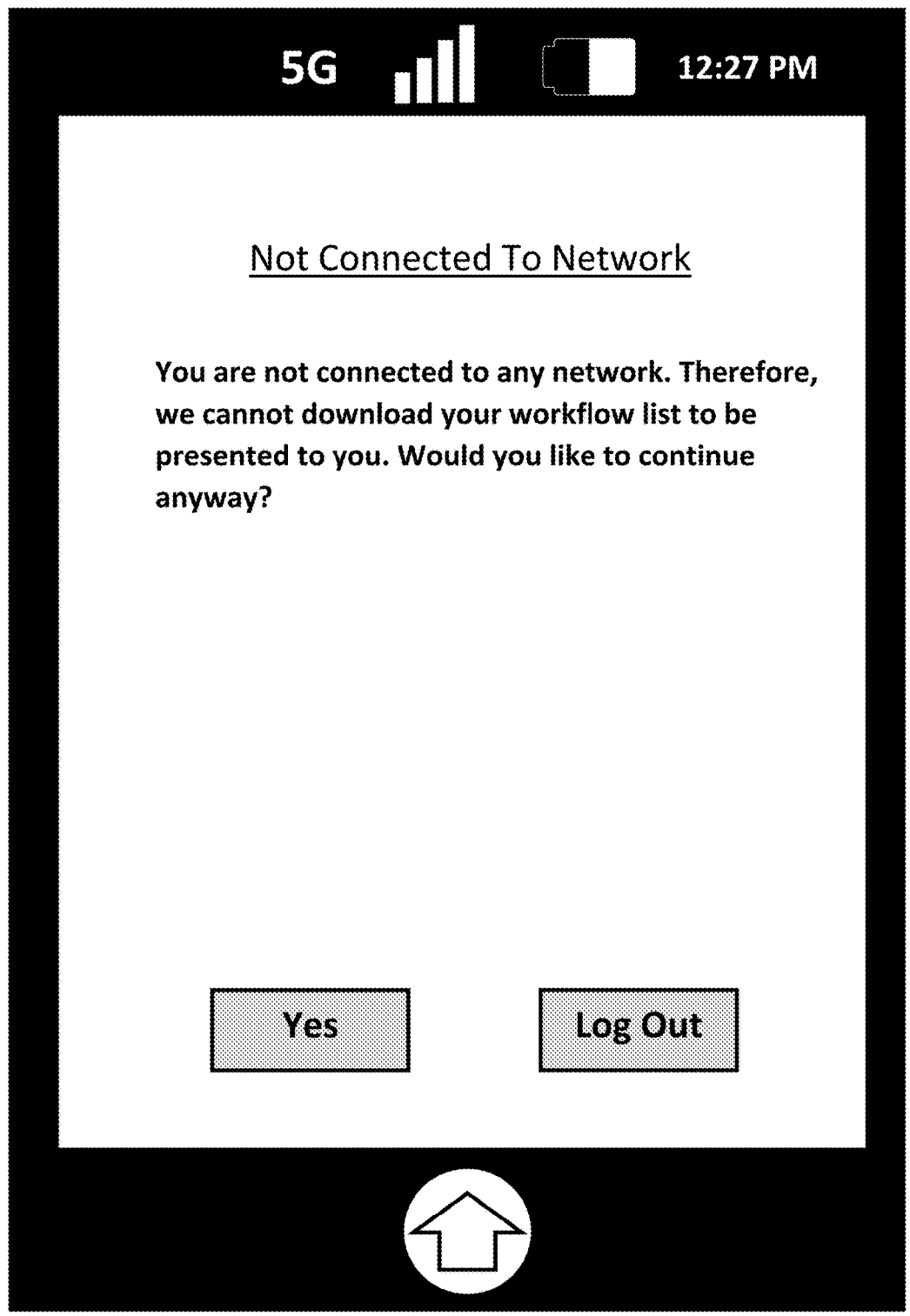
Figures 1, 7D:
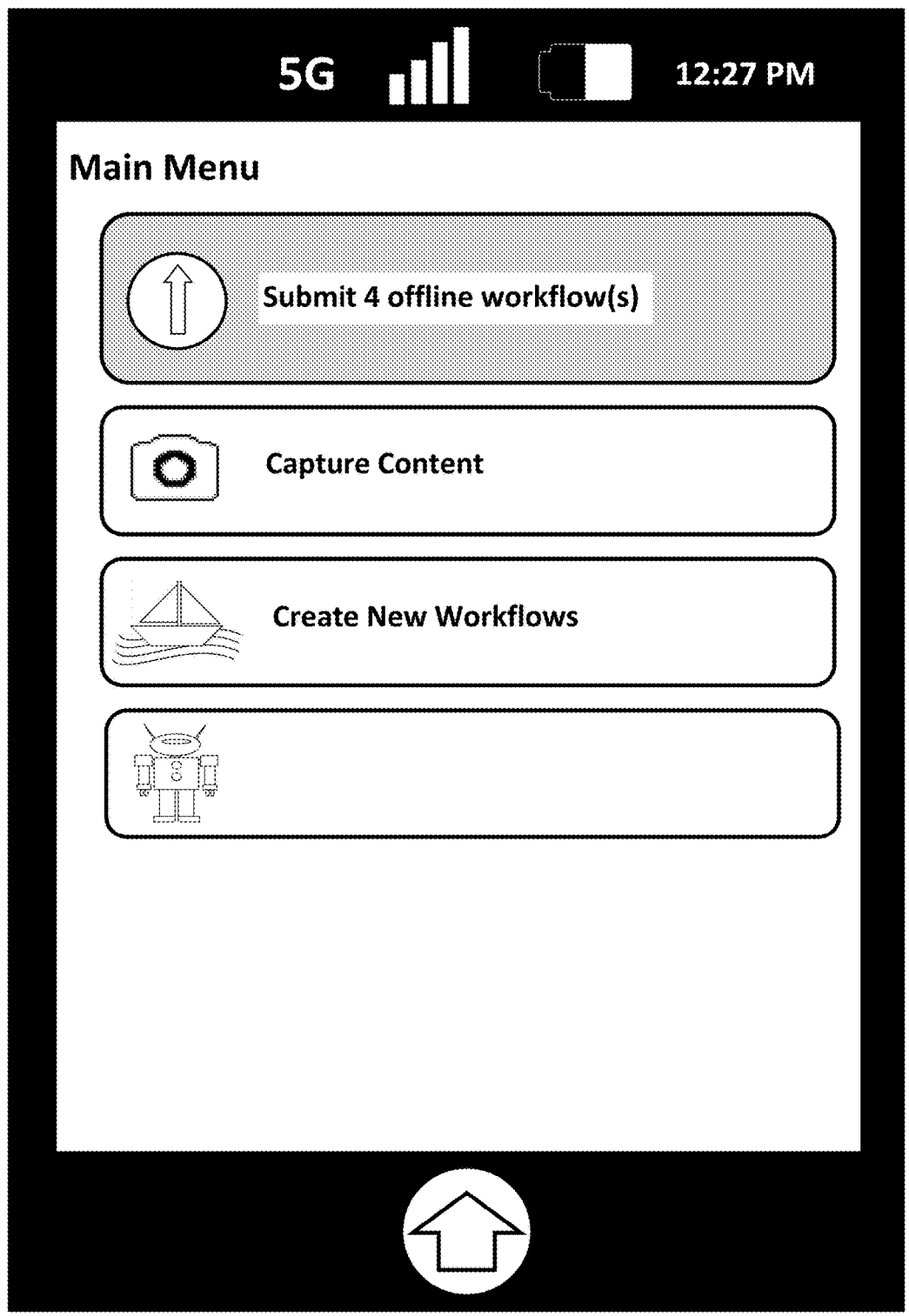
Figures 2, 7D:
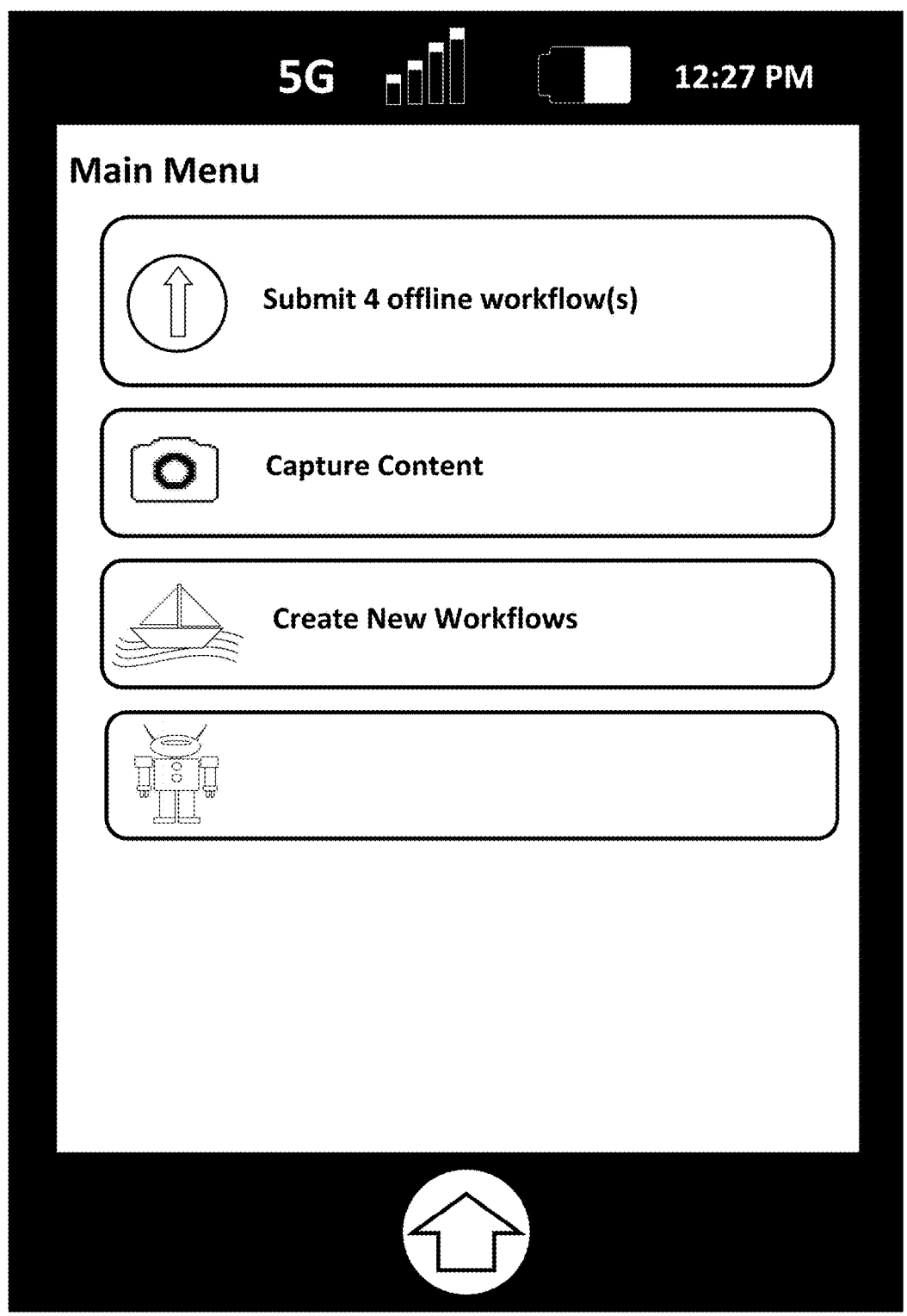

In the case that the terminal apparatus cannot connect to a content management apparatus and/or does not have network access at that time (step S503, No), the user is asked whether to continue using the content capture application, such as shown in FIG. 7C. In this case, the user elects to continue with the content capture application by activating a "Yes" button. Next, the user is presented with a Main Menu in the content capture application, such as shown in FIG. 7D-1. In the Main Menu, the user can capture content, create new workflows and view/edit workflows by activating the corresponding buttons. Further, the user may also submit workflows (i.e. via "Submit 'X' Offline Workflow(s)" button, where 'X' represents the number of workflows that are stored on the terminal apparatus but have not been yet uploaded; in this case 4 workflows are stored) that are stored in the terminal but have not yet been uploaded to, for example, a content management apparatus. However, since the terminal apparatus is not connected to the network, the option for submitting (i.e. uploading) workflows is greyed out thereby rendering it not selectable by the user. On the other hand, if the terminal apparatus is connected to the network, the user can select the option for submitting workflows (i.e. "Submit 'X' Offline Workflow(s)" button), such as shown in FIG. 7D-2.

Figure 7E:
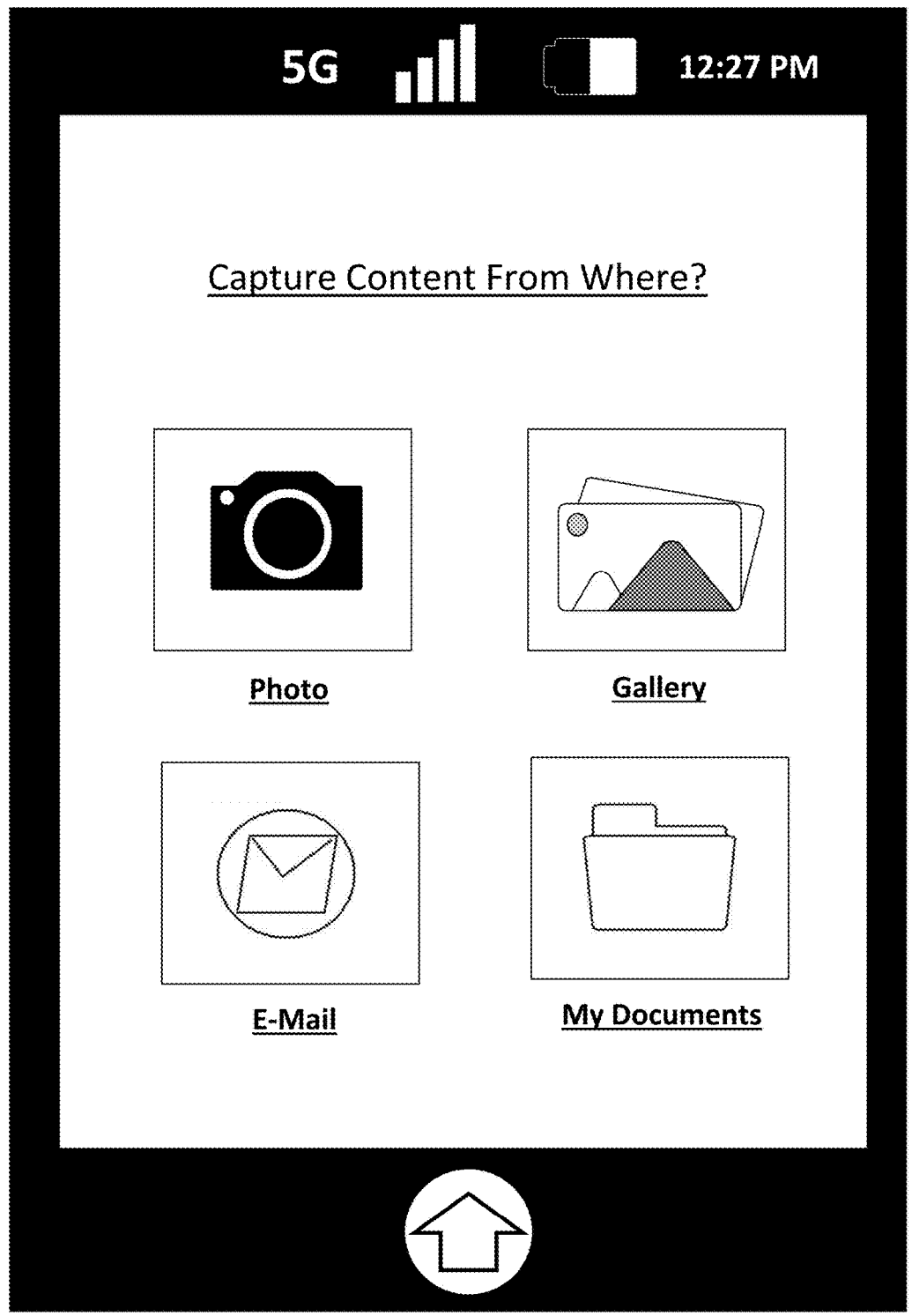

In the case that the user selects Capture Content in the Main Menu, the content capture application, in response to the user instruction to capture content (step S504), presents the user with one or more options (e.g., e-mail, documents, taking a photograph, etc.), such as shown in FIG. 7E.

Figures 1, 7F:
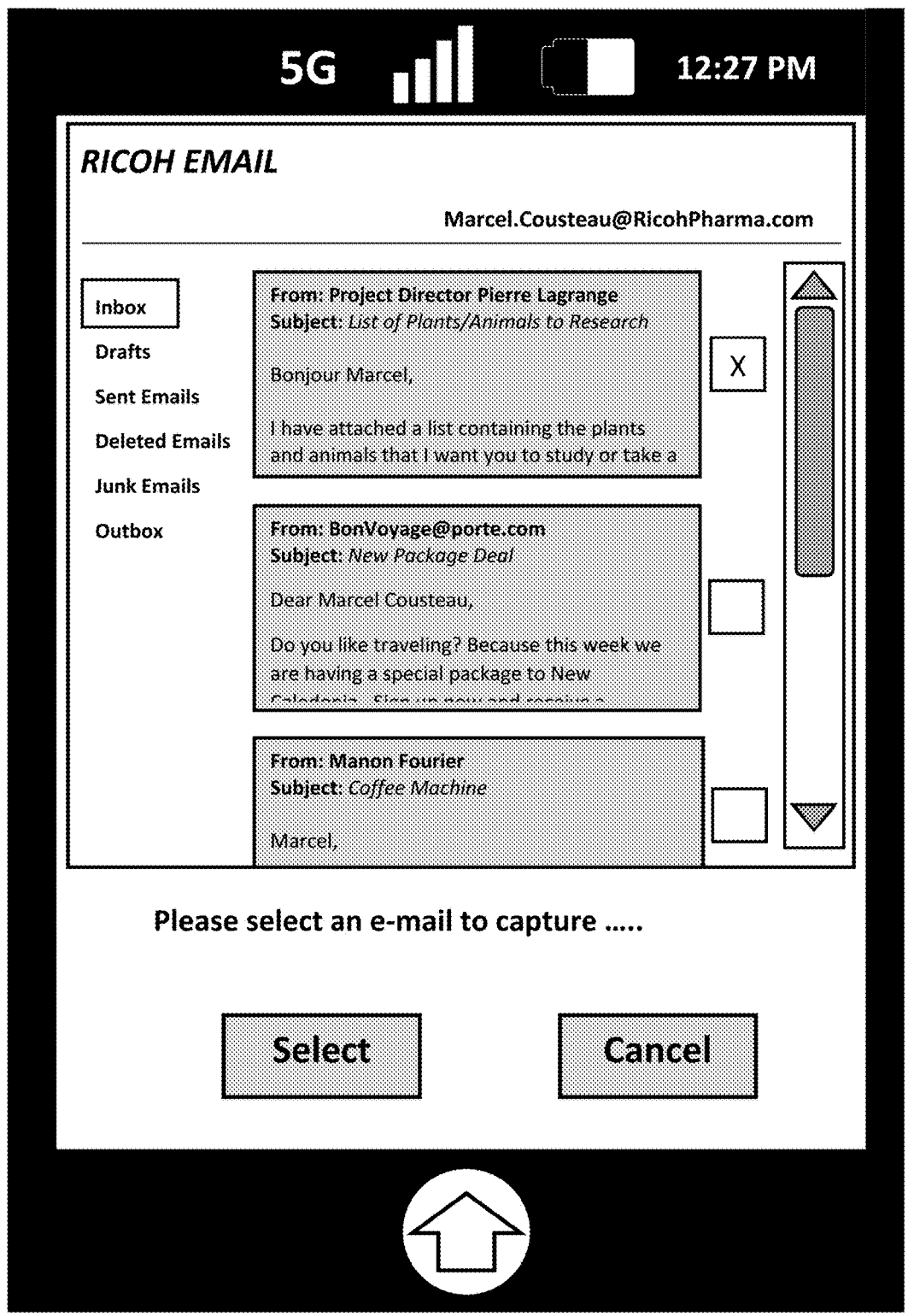
Figures 2, 7F:
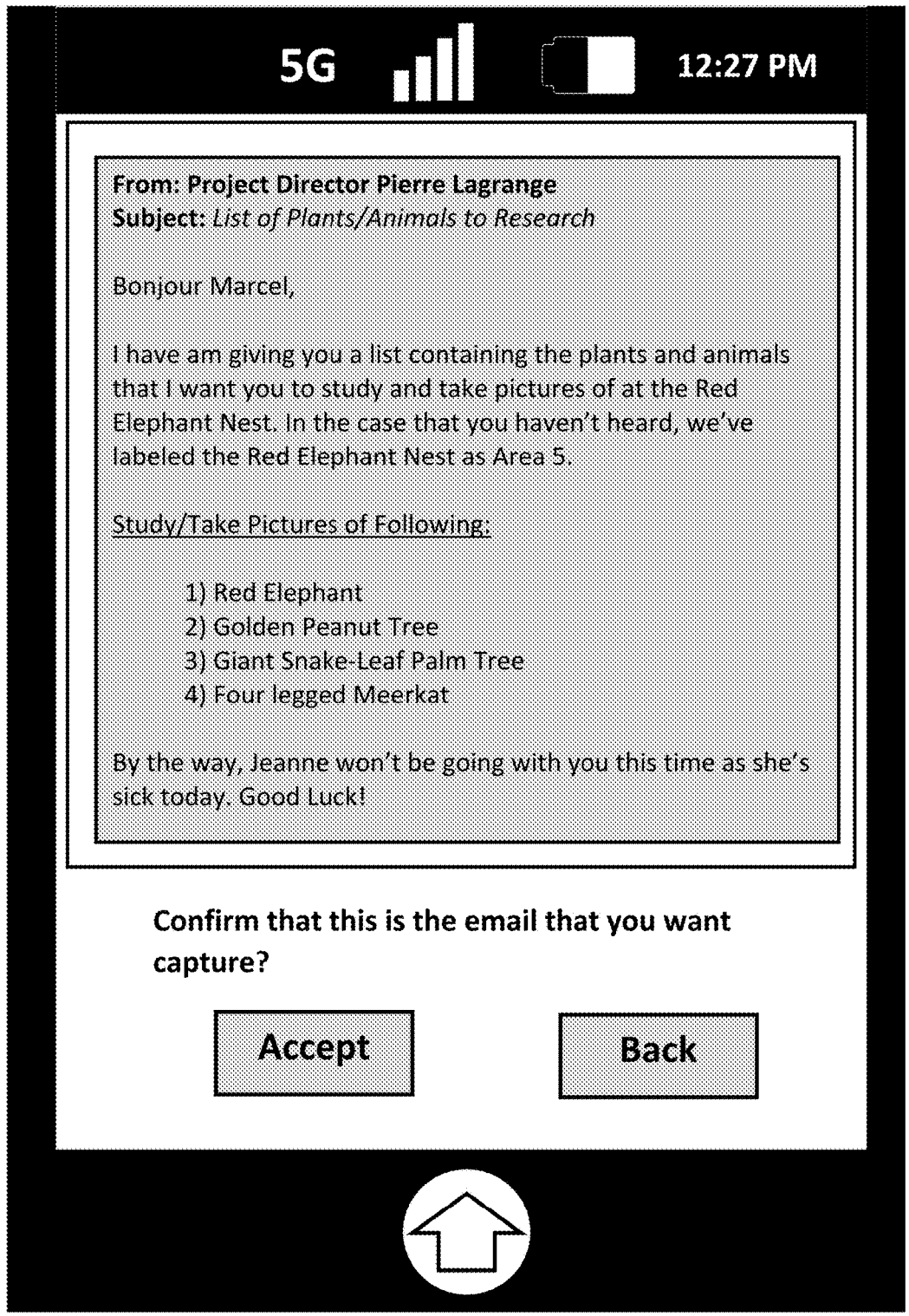
Figures 3, 7F:
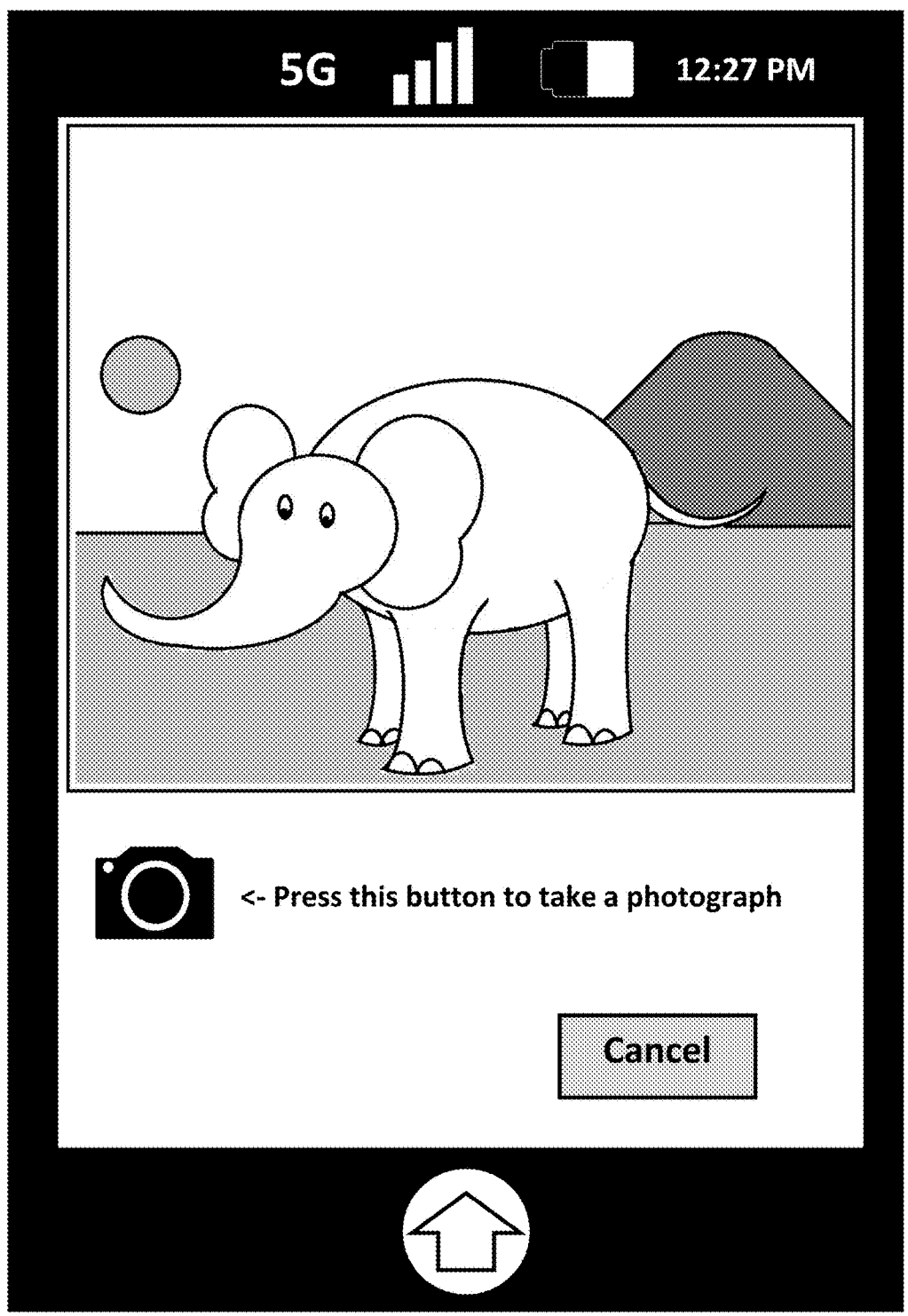

As an example, the user may decide to capture an e-mail (or an attachment to the e-mail) into an image (or electronic document), and in such case, when the user activates the "E-Mail" button, the content capture application may access an e-mail application on the user terminal to cause the user's e-mails to be displayed, such as shown in FIG. 7F-1. Thus, the user may view his or her e-mails and then select an e-mail (reflected by "X" in corresponding check box) and activate the Select button. In response to such user instruction, the content capture application shows the selected e-mail and asks the user to verify that the user wishes to capture such e-mail, such as shown in FIG. 7F-2. In response to confirmation (user presses Accept button), the content capture application captures the e-mail as a content image [such as an image (e.g., .jpeg file, .tiff file, .png file, etc.) or electronic document (e.g., .pdf file, etc.)] (S505). In the example shown in FIGS. 7F-1 and 7F-2, the user has decided to capture an image of an e-mail from his boss ("Project Director Pierre Lagrange"), since it specifies assigned tasks and a list of items to study and capture.

In another example, the user activates the Photo button (FIG. 7E) to activate a camera application to take a digital photo, such as shown in FIG. 7F-3, (or may retrieve a locally stored photo or digital image, that was previously taken or received). In this example, the user takes a photo ("Red Elephant") at a "Red Elephant Nest" located in a "Quebec Tropical Rainforest", since this was part of his assigned tasks, such as shown in FIG. 7F-2.

Figure 7G:

After the content capture application captures the content specified by the user (step S505), the content capture application prompts the user to specify a name for the captured image and confirm whether additional information is to be entered as metadata to be associated with the captured image, such as shown in FIG. 7G. In the example shown in FIGS. 7F-3 and 7G, the user names the content image "Strange Red Elephant" and confirms that he would like to enter additional information as metadata to be associated with the content image (step S506). In response, the content capture application displays (step S507) a list of all workflows that are locally stored (i.e. cached on the terminal) for user selection of a workflow, such as shown in FIG. 7H.

It should be noted that, as discussed supra, the terminal apparatus that the user is currently using is not connected to the network. As a result, the content capture application may only display workflows that are stored on the terminal and cannot download workflows from the content management apparatus. It should also be noted that the workflows in this example (e.g., "Area 1: Home Office", "Area 2: Green Mountain Range", "Area 3: Lush Jungle", "Area 4 Mirage Island") may be have been created under different circumstances. For example, the workflow "Area 1: Home Office" may be a workflow that is created by an application or system administrator and therefore is stored by default on the terminal. On the other hand, another workflow "Area 2: Green Mountain Range" may have been created by another member of a group to which the user is also member and all members of the group are permitted to access the workflow (i.e. "Area 2: Green Mountain Range").

Figure 7H:
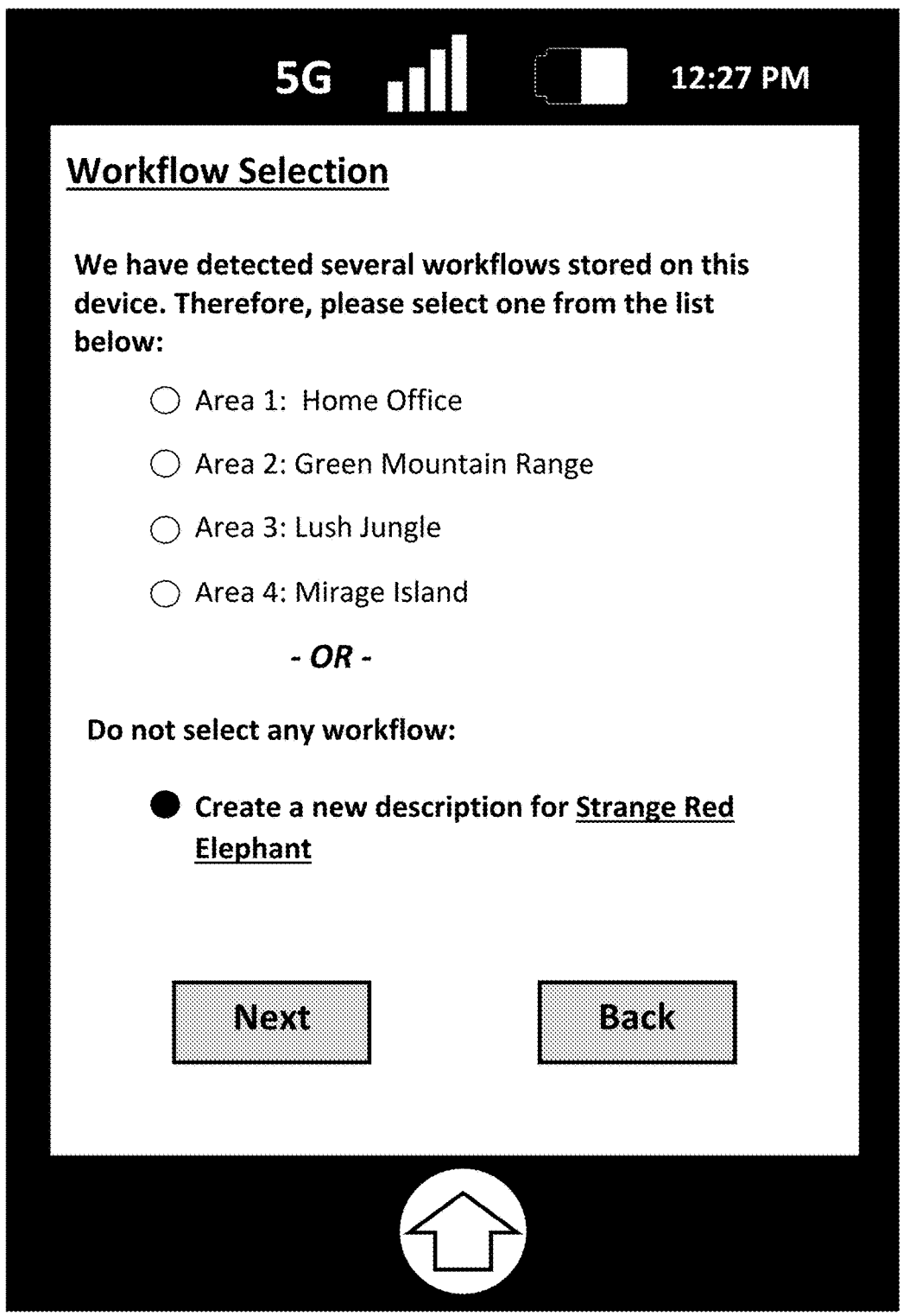

The user may also have an option of not selecting an existing workflow (FIG. 7H). In the case that the user selects an existing workflow (step S508, Yes), the content capture application presents the metadata registered with the selected workflow for confirmation or editing and upon confirmation, associates the confirmed metadata with the content image (step S509).

On the other hand, the user may not select an existing workflow and instead elects to enter new metadata for the content image (step S508, No). In such instance, the user is presented with one or more metadata entry screens, such as shown in FIG. 7I and FIG. 7J, and the content capture application registers the user-entered information as metadata (step S510).

In an exemplary embodiment, one or more of the metadata fields may be pre-filled in. In other words, the metadata field is automatically filled in without any action from the user. For example, the "Document Creation Date" metadata field may be automatically filled in with information on the creation date of the content image, or the "Author" metadata field may be filled in using the login name of the user. It should be noted that it is not required for the user to fill in every metadata field. In other words, he or she may leave one or more metadata fields empty.

Figure 7I:
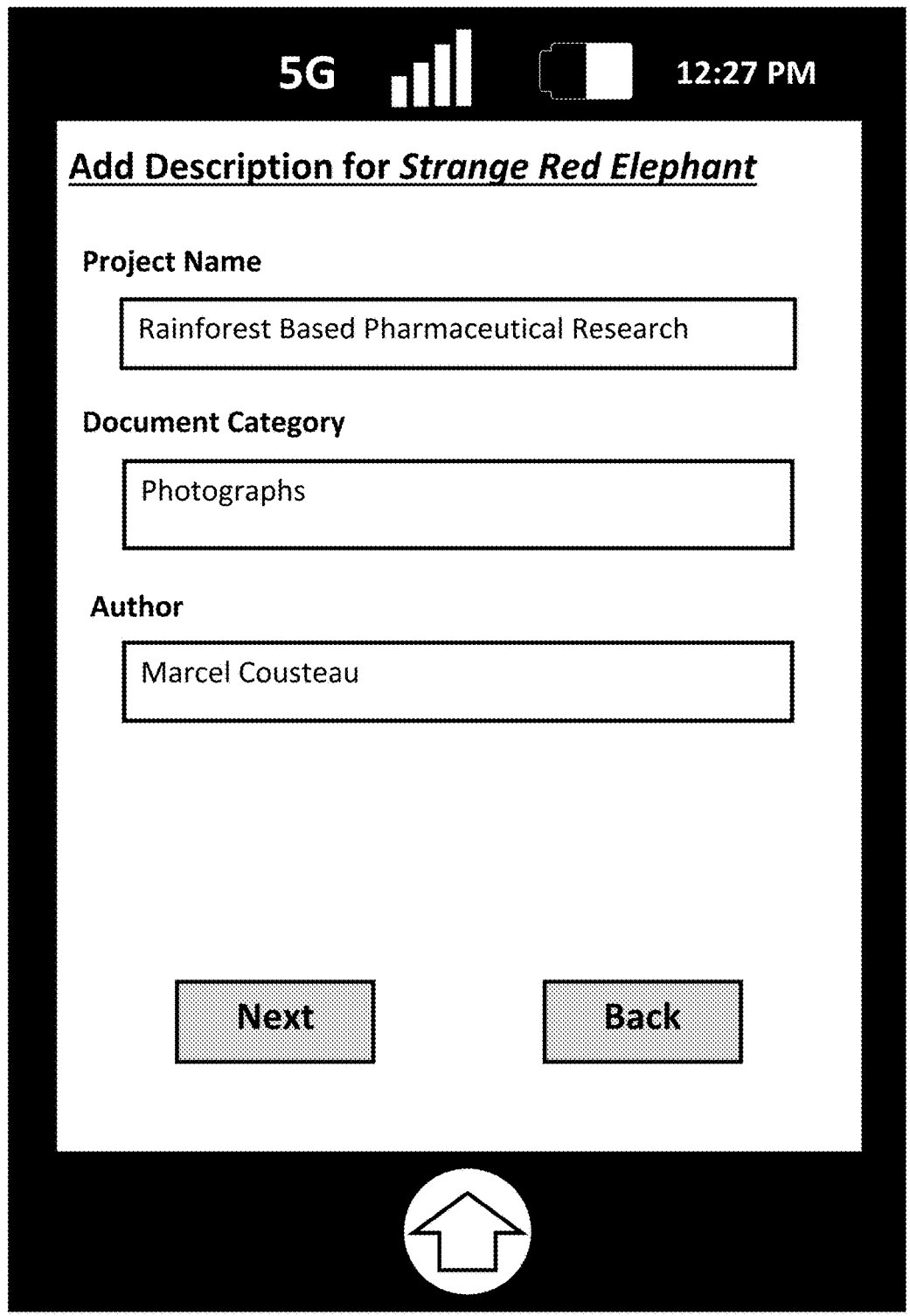
Figure 7J:
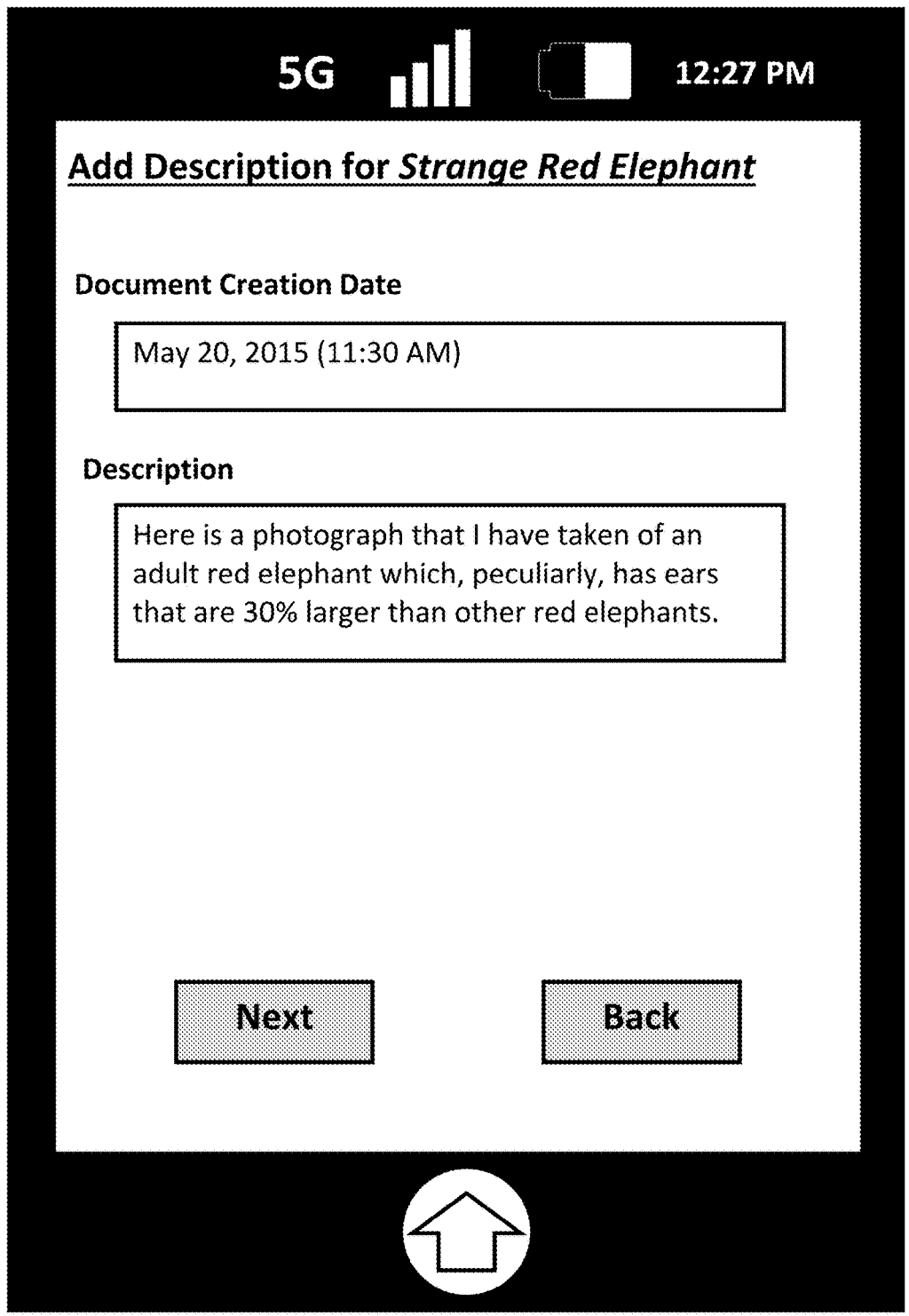

In another exemplary embodiment, the content capture application may display fixed fields, such as shown in FIG. 7I and FIG. 7J. For example, the user's employer may have content management policies that require each content image to have a set of fixed metadata fields. In such instance, an application or system administrator may have configured the content capture application, and/or the content management apparatus, to provide the set of fixed metadata fields.

Figure 7K:
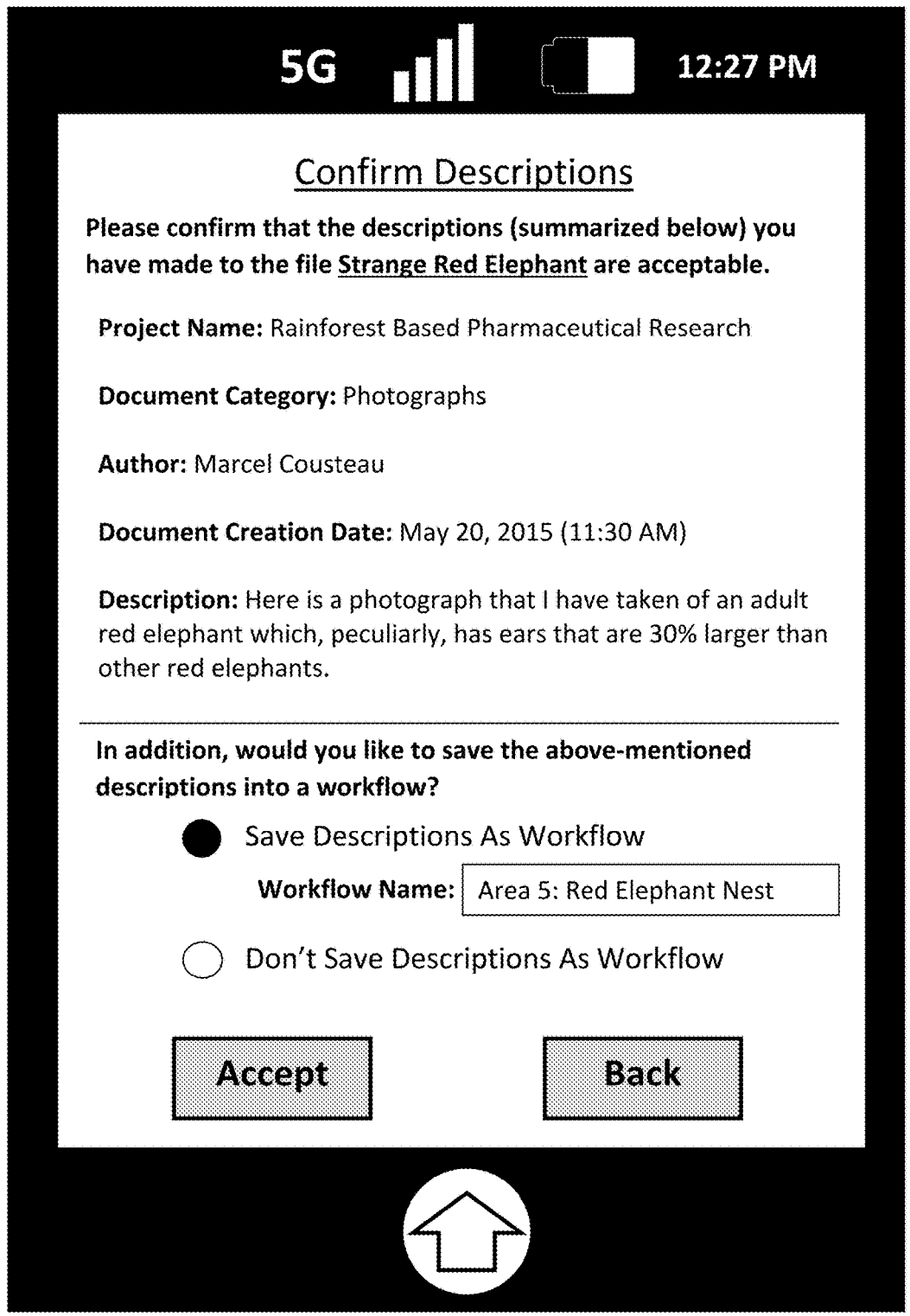

As the metadata is entered in the metadata entry screens, the content capture application caches the metadata, and after the user selects the Next button on the last of the metadata entry screens, or as the metadata is being cached, the cached metadata may be associated with the content image (S511). Further, after the user selects the Next button on the last of the metadata entry screens, the content capture application may provide a summary of the metadata entered in the metadata entry screens, for confirmation by the user, such as shown in FIG. 7K.

Figure 7L:
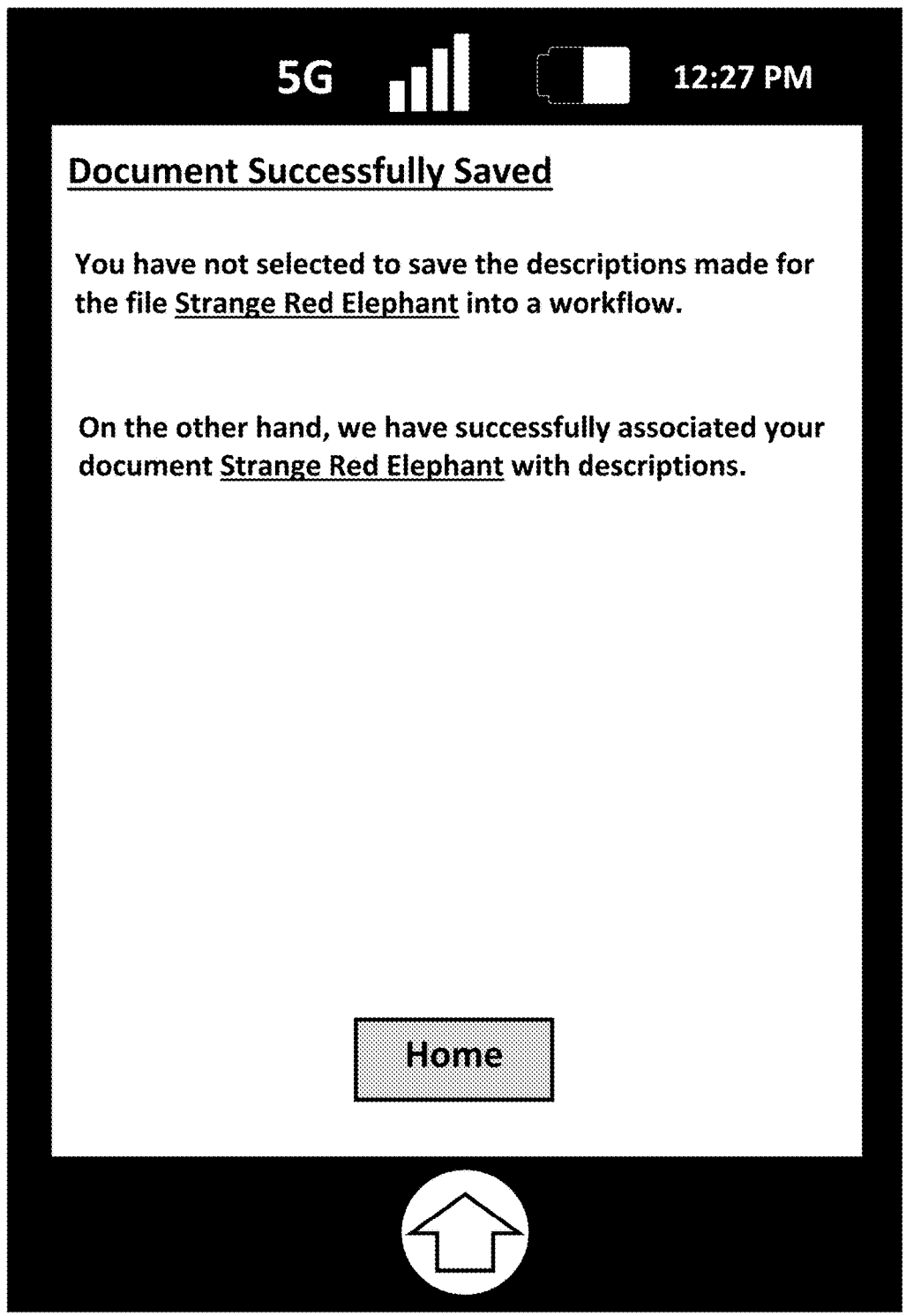

The content capture application may also prompt the user to confirm whether the metadata is to be registered as a new workflow (step S512), and in the case that a new workflow is to be registered, to specify a name for the workflow. In this example (FIG. 7K), the user named the workflow "Area 5: Red Elephant". In the case that the user selects not to save the metadata into a workflow (step S513, No), the content capture application displays a message, such as shown in FIG. 7L, confirming that the metadata has been associated with the content image but the metadata has not been registered into a new workflow.

Figure 7M:
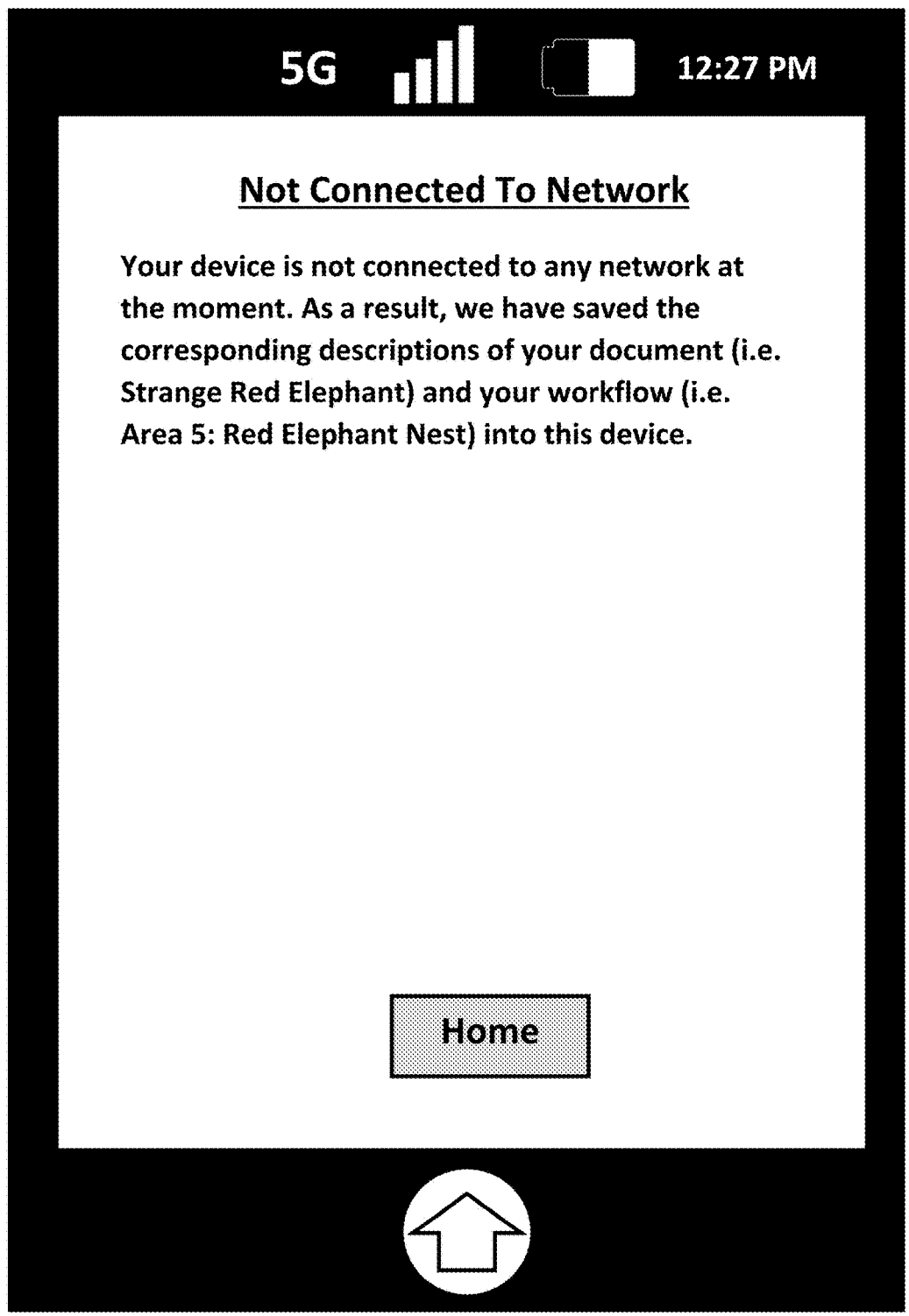
Figure 7N:
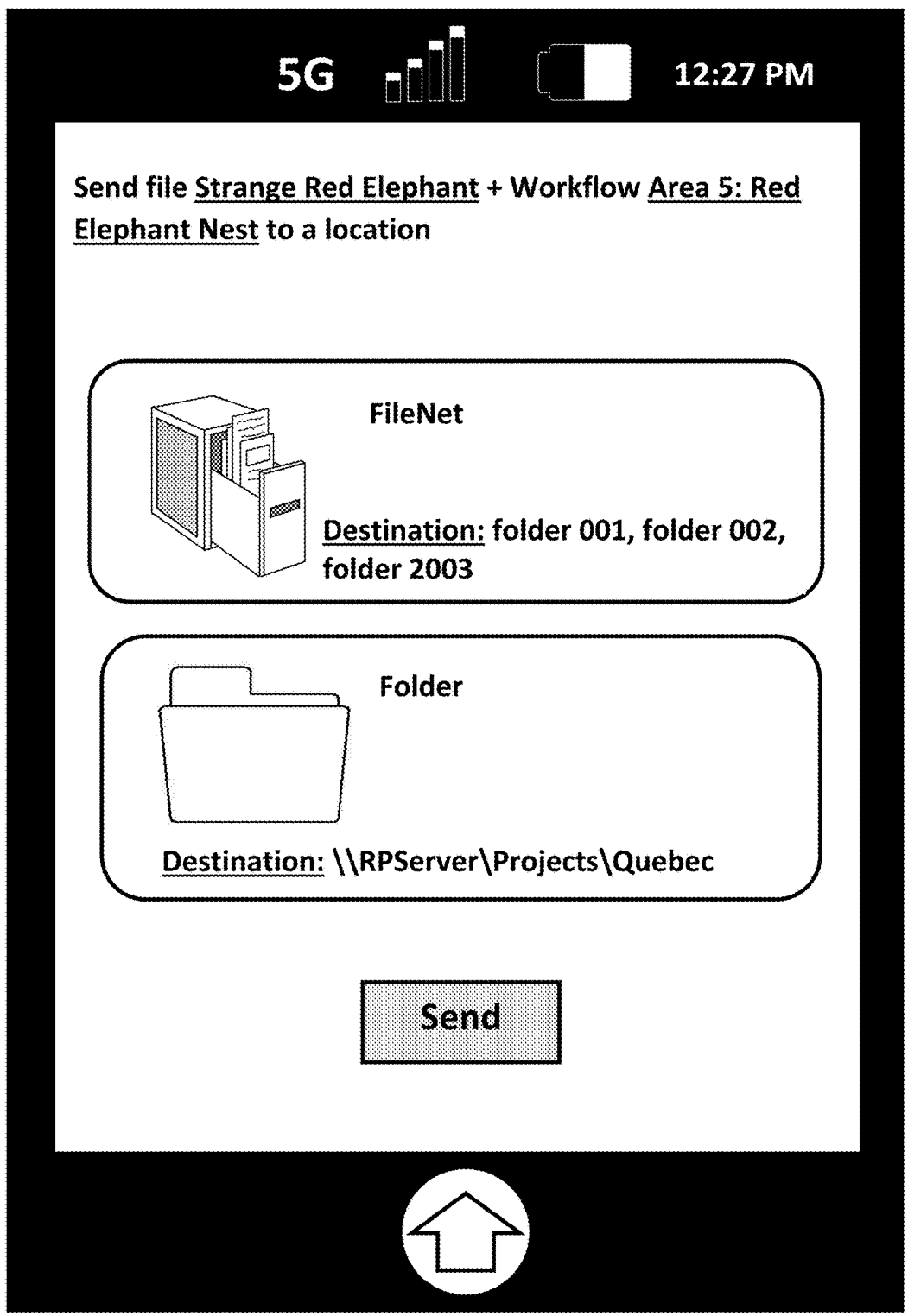

On the other hand, in the case that the user selects to save the metadata into a workflow (step S513, Yes), the content capture application determines whether the terminal apparatus is connected to the content management apparatus (step S514). In the case that the terminal apparatus is not connected to the content management apparatus and/or does not have network access (step S514, No), the content capture application caches the workflow locally in the terminal apparatus (step S515) and displays a message, such as shown in FIG. 7M. In the case that the terminal apparatus is connected to the network (step S514, yes), the user may be prompted to specify a location to which the content image (including metadata) and the workflow is to be uploaded (e.g., by the content management apparatus), such as shown in FIG. 7N. For example, the user interface screen may provide a choice of locations, e.g., a folder (\\RPServer\Projects\Quebec) on a file server, or a folder in another file system "File Net".

Figure 7O:
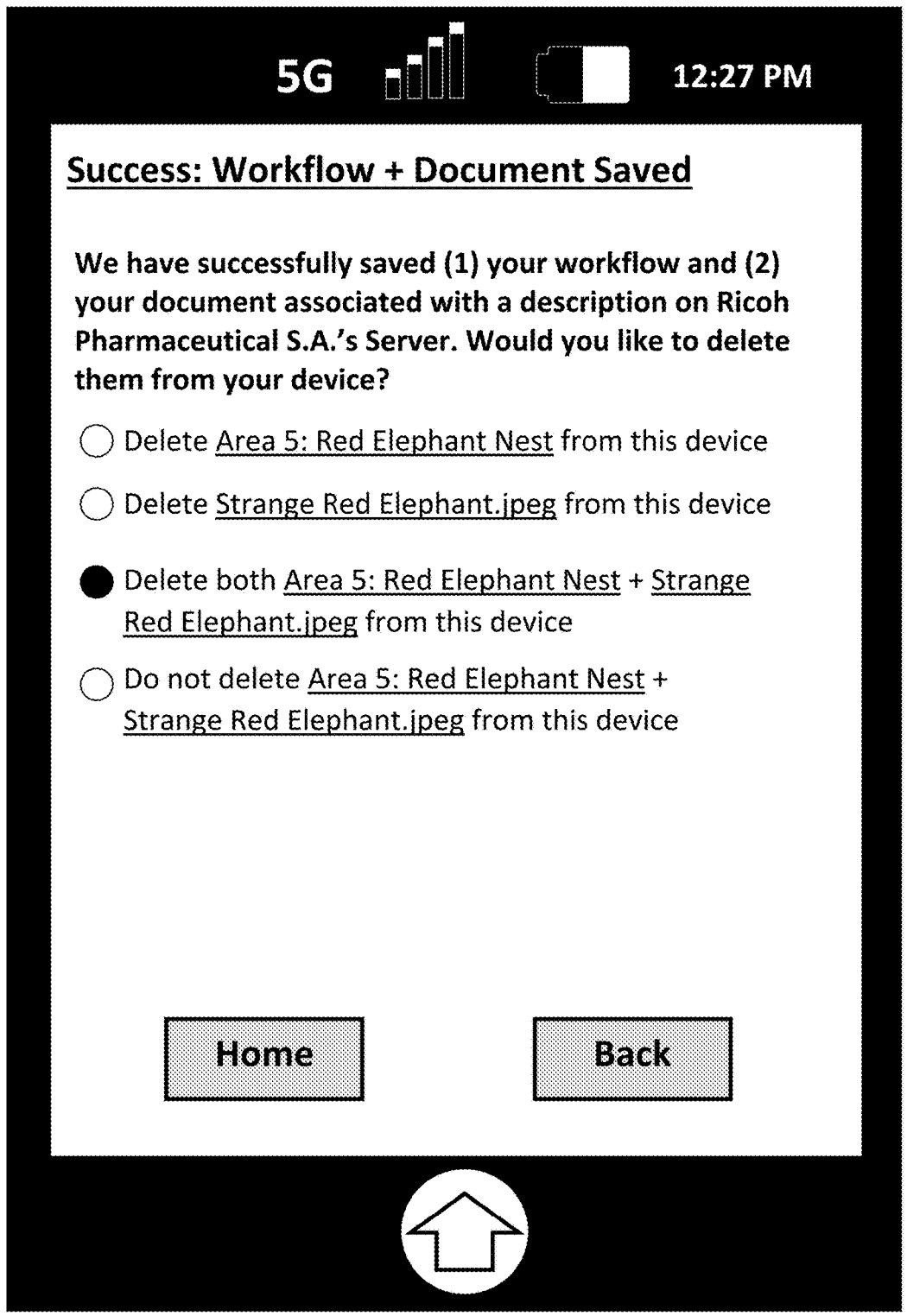

After the content capture application uploads both the workflow and the content image including the corresponding metadata (step S516), the user may be presented with the option of deleting the workflow and the content image that was uploaded to the content management apparatus from the terminal apparatus, such as shown in FIG. 7O. As shown, it is not necessary for the user to delete both the workflow and the content image from the terminal apparatus. Instead, the user can opt to delete one or the other or none at all.

Figure 8A:
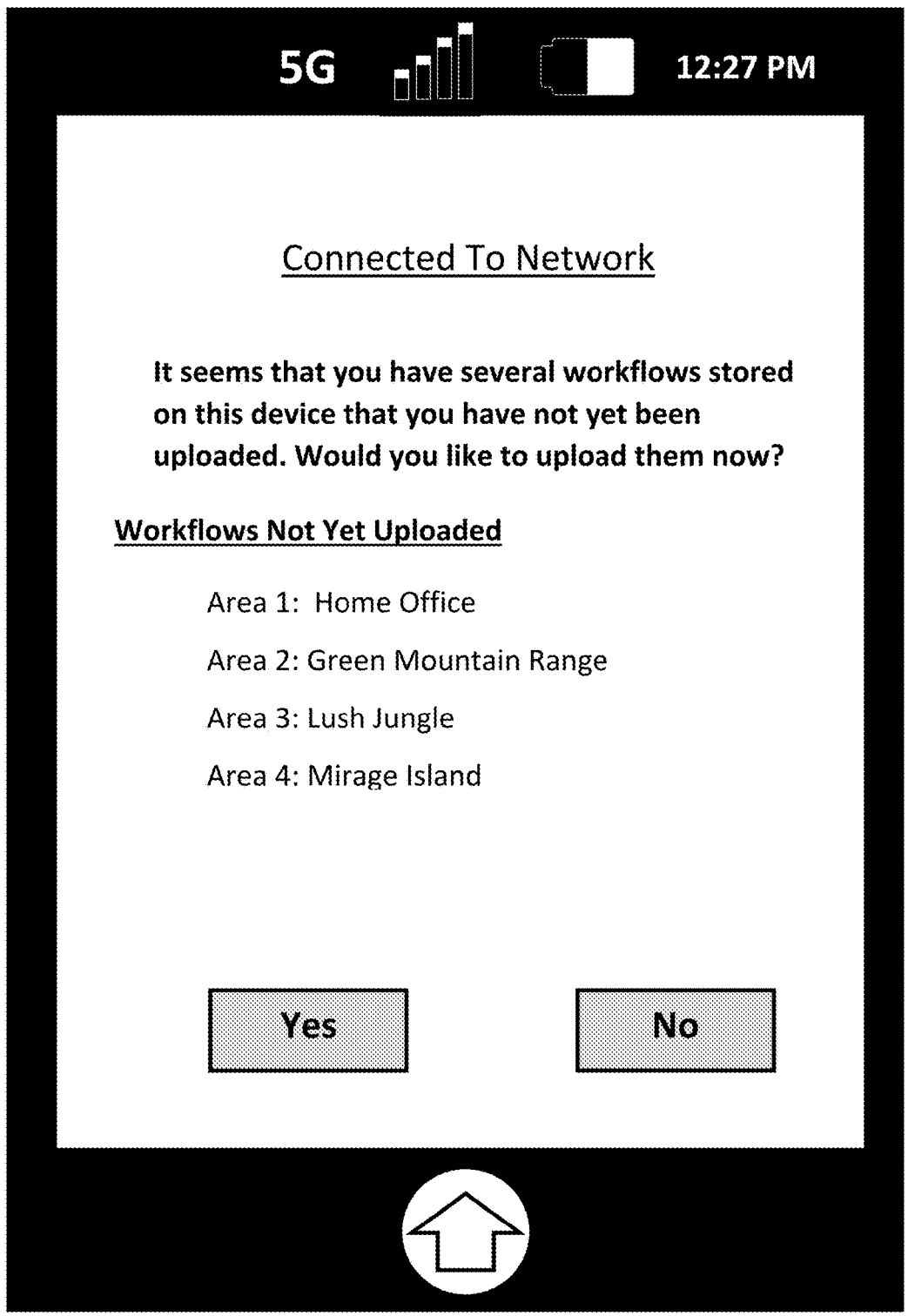
FIGS. 8A-8F show examples of user interface screens that can be provided by a user interface module of a content capture application, such as shown in FIG. 1, according to an exemplary embodiment.

Referring back to FIG. 6A, when the content capture application connects to the content management apparatus (step S503, Yes), the content capture application may determine whether there are workflows cached in the terminal apparatus and have not yet been uploaded to the content management apparatus (step S701). If there are no such workflows (step S702, No), the user may move on to the next step (S504), for example, to start capturing content, associate metadata with content image, etc.). Otherwise (step S702, yes), the user may be presented with the option of uploading workflows stored on the terminal apparatus (if the user had none done so previously) that are displayed to the user after being authenticated by the content capture application, such as shown in FIG. 8A.

Figure 8B:
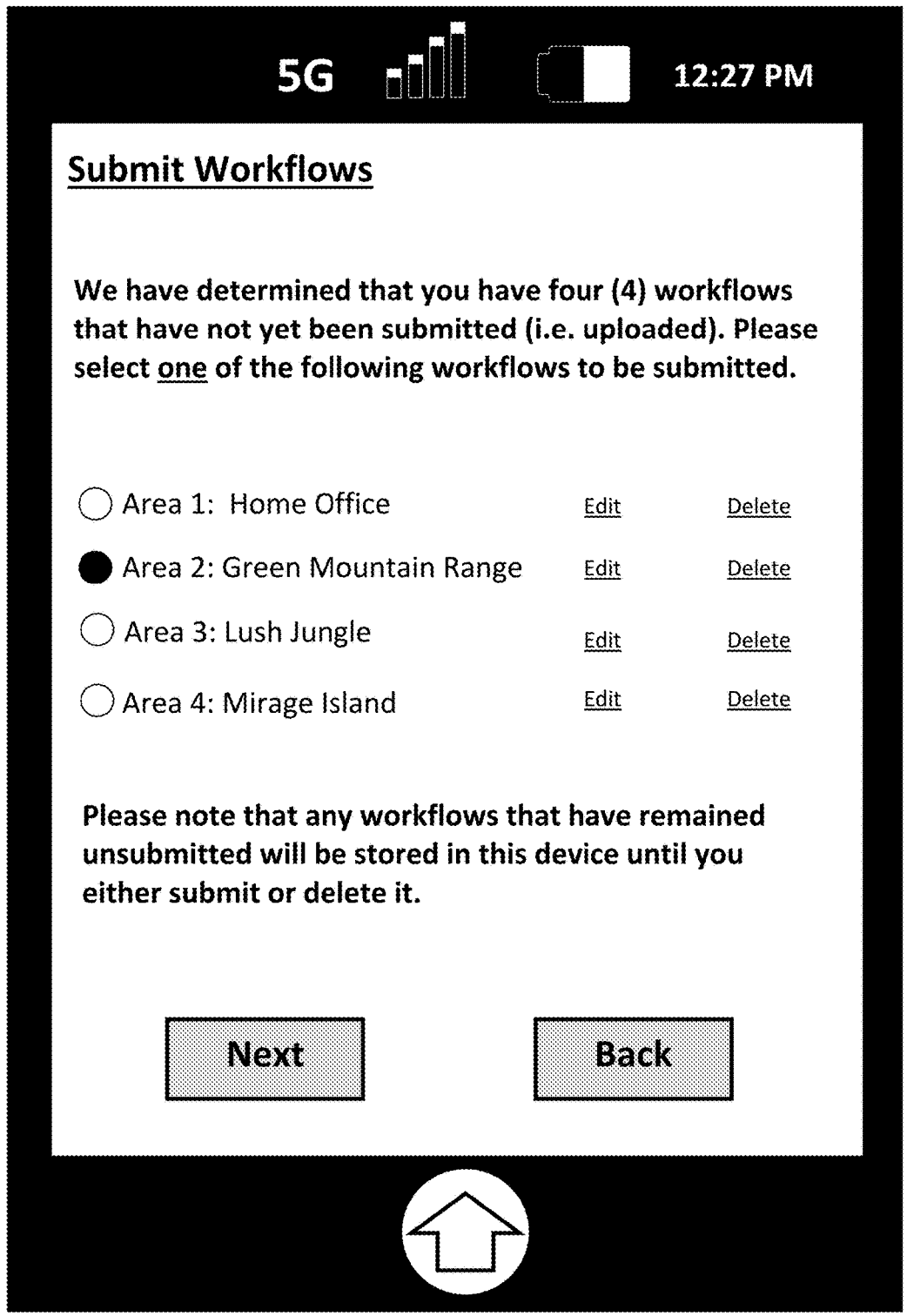

In the case that the user wishes to upload his or her workflows, the user is shown a list of one or more workflows currently stored on the terminal apparatus that have not yet been uploaded to the content management apparatus, such as shown in FIG. 8B. The user can select any of the workflows on this list and can edit a selected workflow by activating the "edit" button before submitting it to the content management apparatus [or delete the workflow by activating the "delete" button]. Editing may be performed to correct information already in the metadata fields or supply information missing from the fields.

Figure 8C:
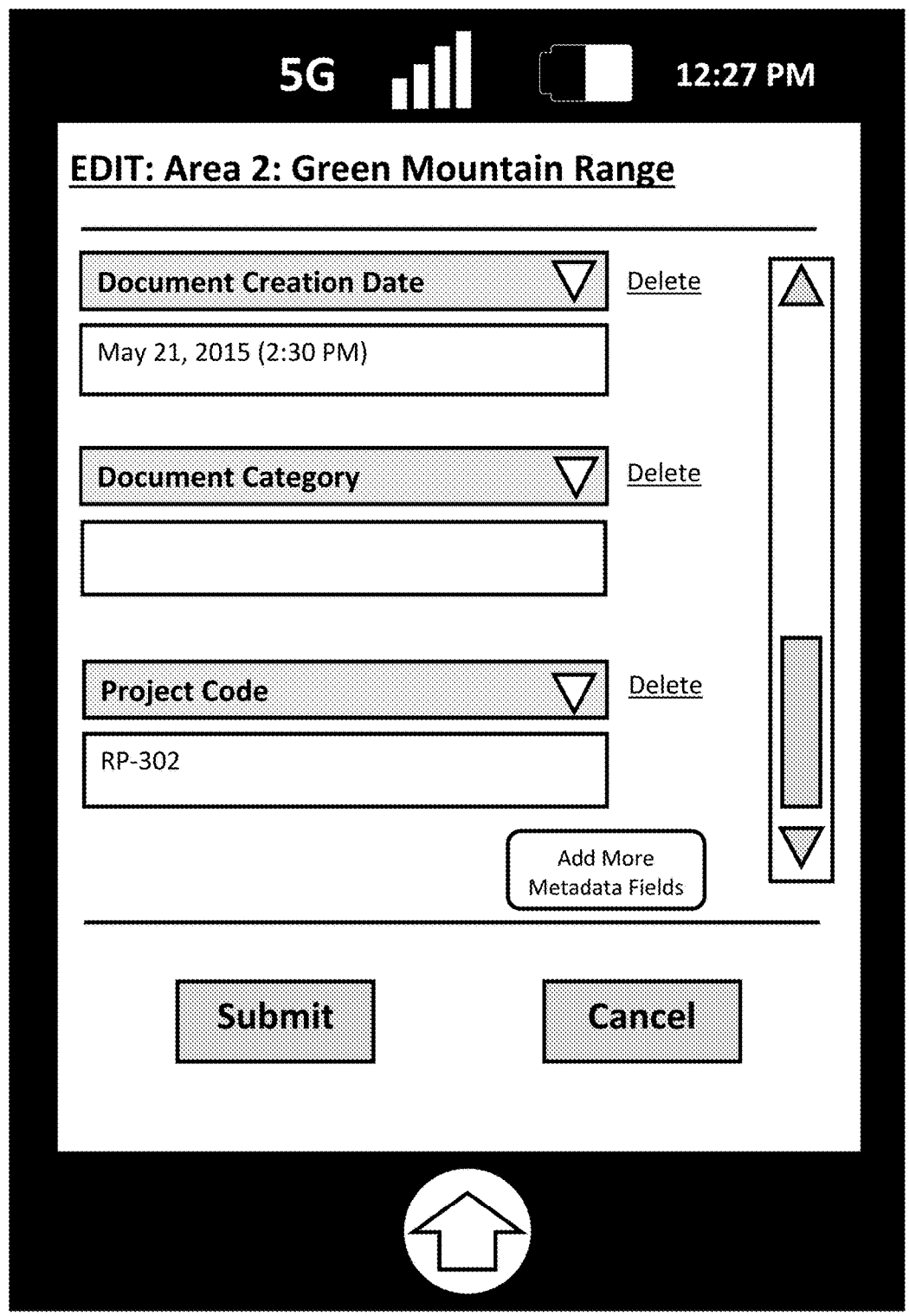

For example, after the user has performed research in the "Green Mountain Range" and returns to his office, he may have realized that some of the metadata in the workflow "Area 2: Green Mountain Range" is incorrect or is missing. In the example shown in FIG. 8C, the user left a Document Category field empty since at the time, the user was unsure of the document category, or simply inadvertently omitted such information.

Figure 8D:
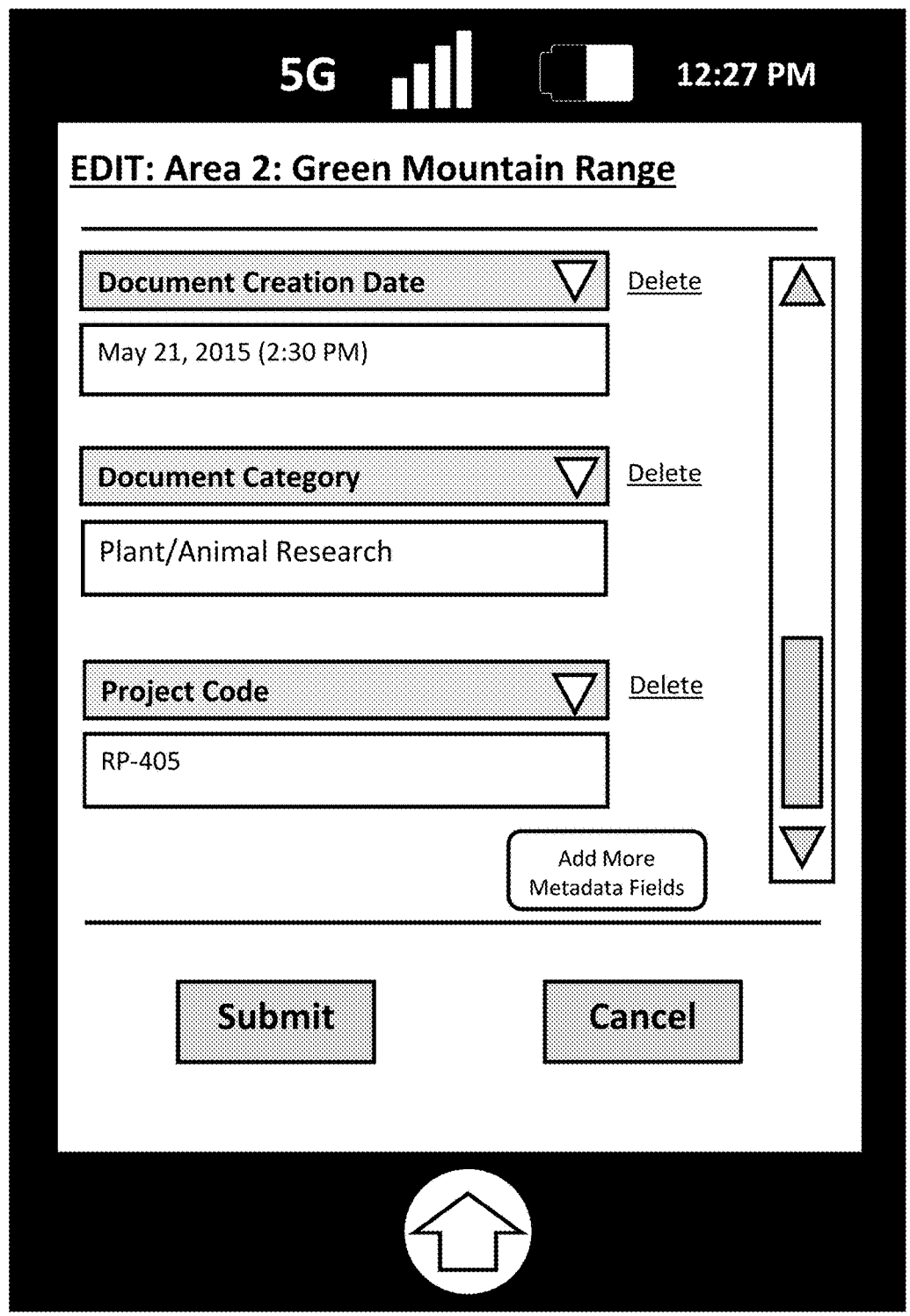

As another example, the user's employer or supervisor may have replaced the Project Code "RP-302" with "RP-405". Consequently, the Project Code ("RP-302") that was previously registered is outdated. By utilizing the edit function, the user can make the needed (or desired) corrections, before submitting the workflow to the content management apparatus, such as shown in FIG. 8D. In addition, the user may also change the metadata fields (e.g., "Project Code" to "Project Identifier") or reorder the sequence of the metadata fields as well.

Figure 8E:
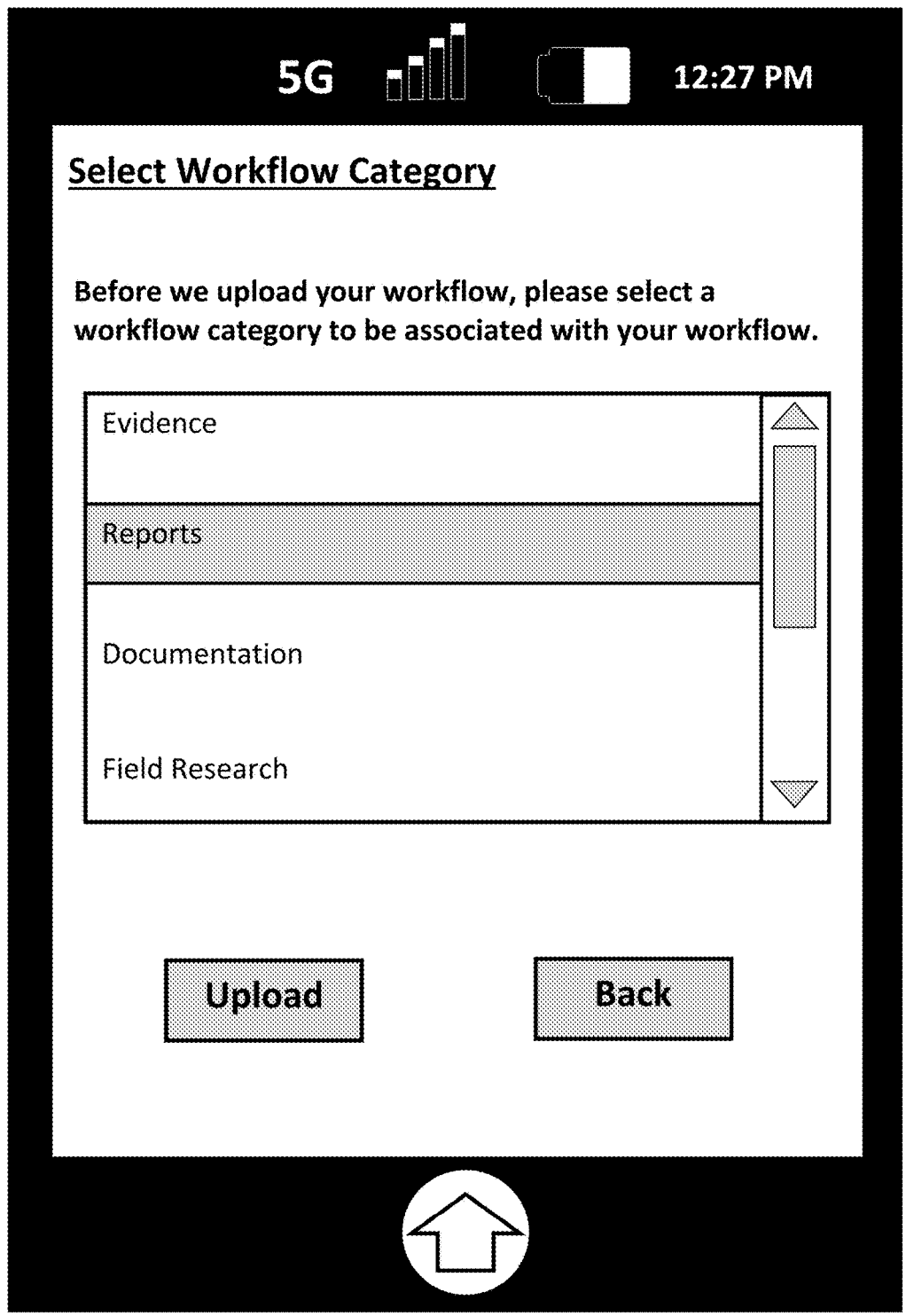

After the user is finished editing the workflow, he or she may select to upload another of the workflows to the content management apparatus. After receiving the workflow indicated by the user (step S703), the content capture application may prompt the user to enter a category (e.g., "Evidence", "Reports", "Documentation", "Field Research", etc.) to be associated with the workflow, such as shown in FIG. 8E. Such categories may be used to organize the workflow when it is stored in the content management apparatus. In other words, in an exemplary embodiment, the content management apparatus may store the workflows according to their categories. Thus, when the user is searching for a particular workflow, he or she may use the categories to quickly search for the desired workflow.

Figure 8F:
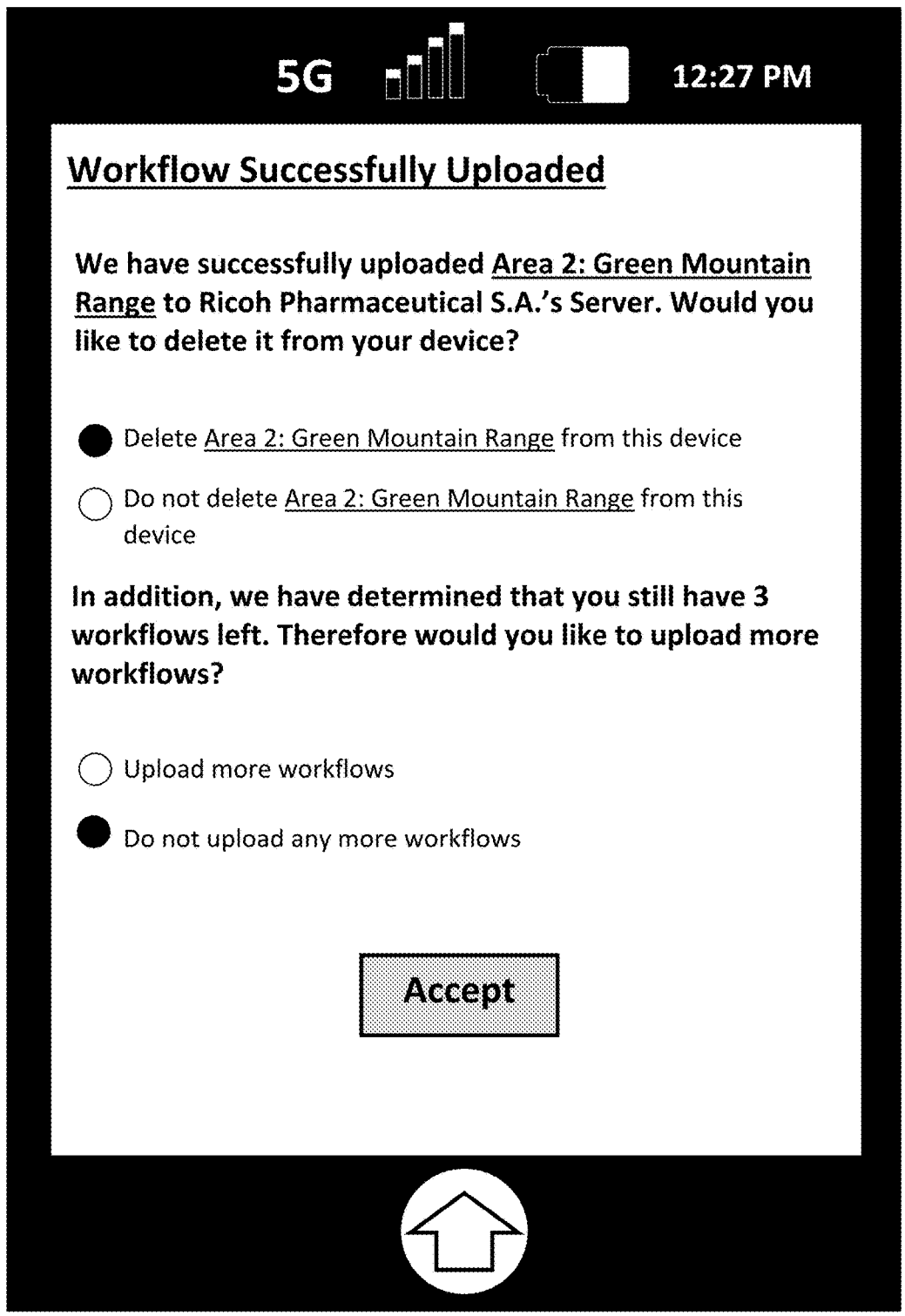

When the user is finished selecting a category and confirms to submit the workflow to the content management apparatus, the content capture application uploads it to the content management apparatus (step S704). Next, the content capture application prompts the user to delete the uploaded workflow (step S705) from the terminal apparatus, such as shown in FIG. 8F. In the case that the user wishes to delete the uploaded workflow from the terminal apparatus (step S705, yes) for one or more reasons (e.g., to make space on the terminal apparatus), the content capture application deletes it (step S706). On the other hand (step S705, no), in the case that the user wishes to store the workflow on the terminal apparatus, the user moves onto the next step. Next, the content capture application determines the amount of workflows left that the user has stored on the terminal apparatus and that have not been uploaded to the content management apparatus and presents such amount to the user. Then, in the case that there are one or more workflows left, the content capture application asks the user whether he or she would like to upload more workflows (step S707). In the case that the user wants to upload more workflows (step S707, yes), the user repeats the process by going back to the screen shown in FIG. 8B. On the other hand (step S707, no) in the case that the user does not want to upload anymore workflows, the process ends.

Figure 9:
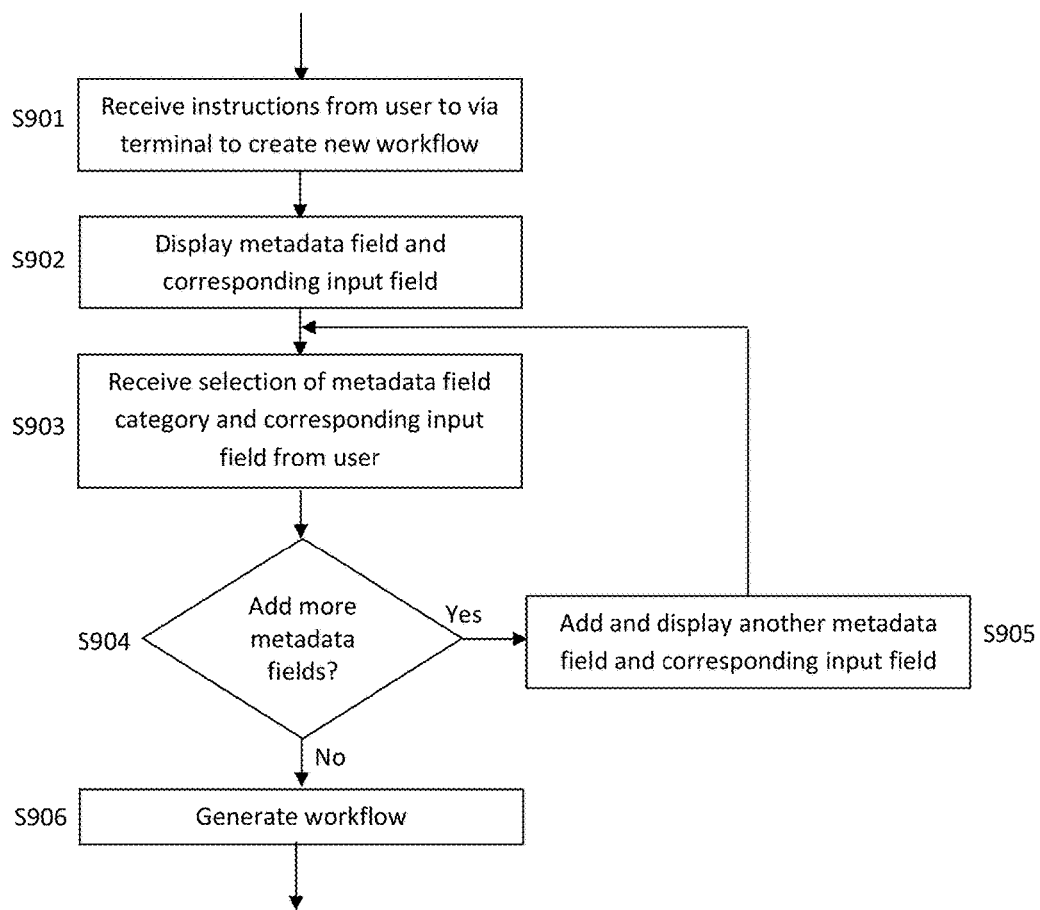
FIG. 9 shows a flow diagram of a method or process performed via a content capture application, such as shown in FIG. 1, according to an exemplary embodiment.

FIG. 9 show an event process or workflow performed by a content capture application (e.g., 101a) on a terminal apparatus (e.g., 101), according to an exemplary embodiment.

Figure 10A:
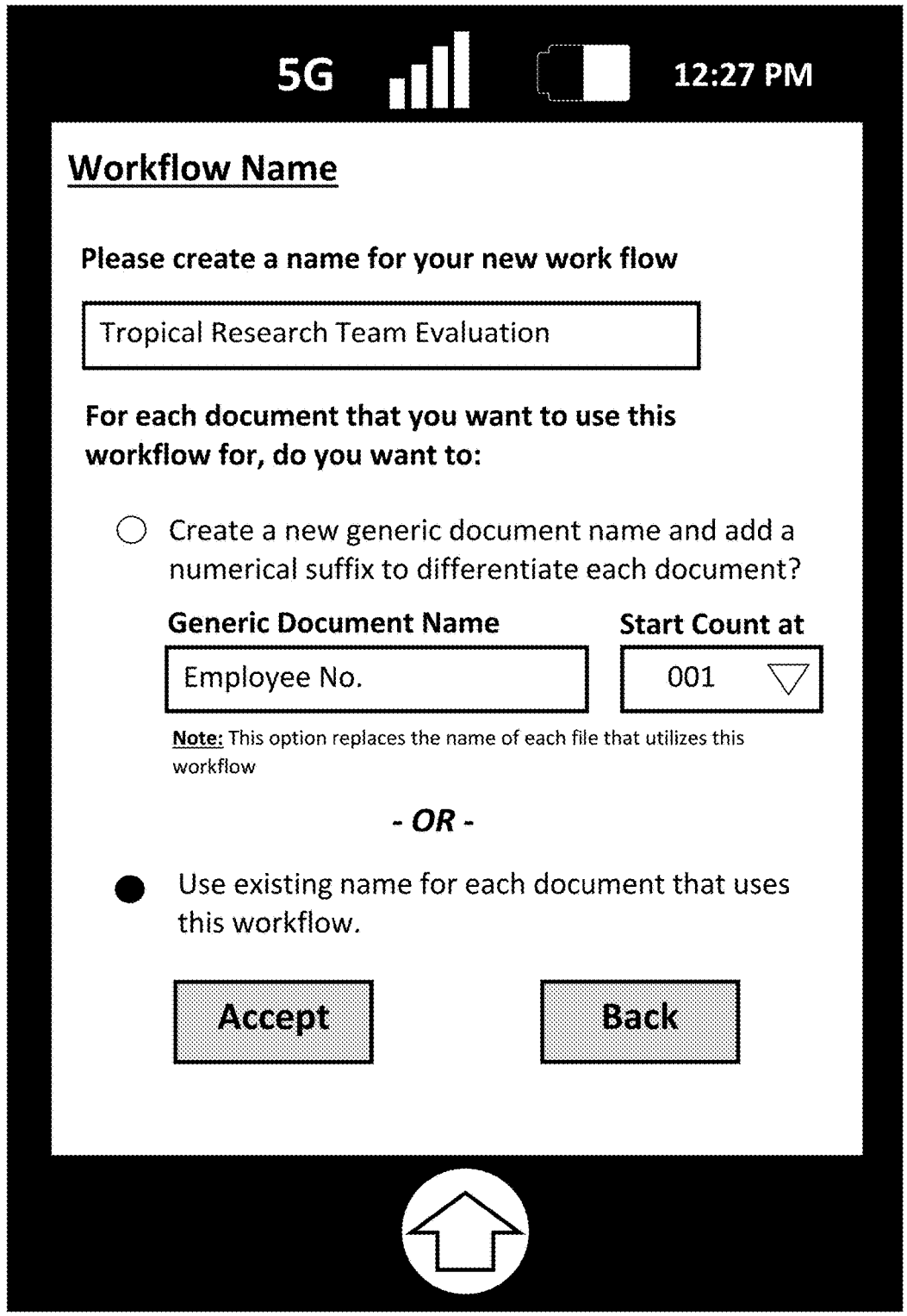
FIGS. 10A-10E show examples of user interface screens that can be provided by a user interface module of a content capture application, such as shown in FIG. 1, according to an exemplary embodiment.

Referring back to FIG. 7D-1 and FIG. 7D-2, the user may select to create a new workflow independent of any content image by activating a "Create New Workflows" button. When the content capture application receives such instruction to create a new workflow (step S901), the user is presented with the option to name the new workflow, such as shown in FIG. 10A. In addition, the user is also given the option, when associating this workflow with a captured content image, to keep the original document name of the captured content image or automatically create a new name in the form of a generic label and a numerical suffix.

For example, the user may be doing an evaluation of employees who are part of the "Tropical Research Team". As a result, he may want to organize the documents (e.g., each document representing a single employee) corresponding to each employee in a sequential order. Thus, by identifying the first document with the name "Employee 001" and the second photograph with the name "Employee 002" he can identify the order of the employees evaluated. The content capture application may increment the numerical suffix every time that the workflow "Tropical Research Team Evaluation" is selected. In other words, while the user has already created a name for each document, by selecting this workflow (i.e. "Tropical Research Team Evaluation"), the name of each document is replaced by the aforementioned generic name and sequential numerical suffix. In an exemplary embodiment, the user can reset the numerical suffix by editing the workflow.

Figure 10B:
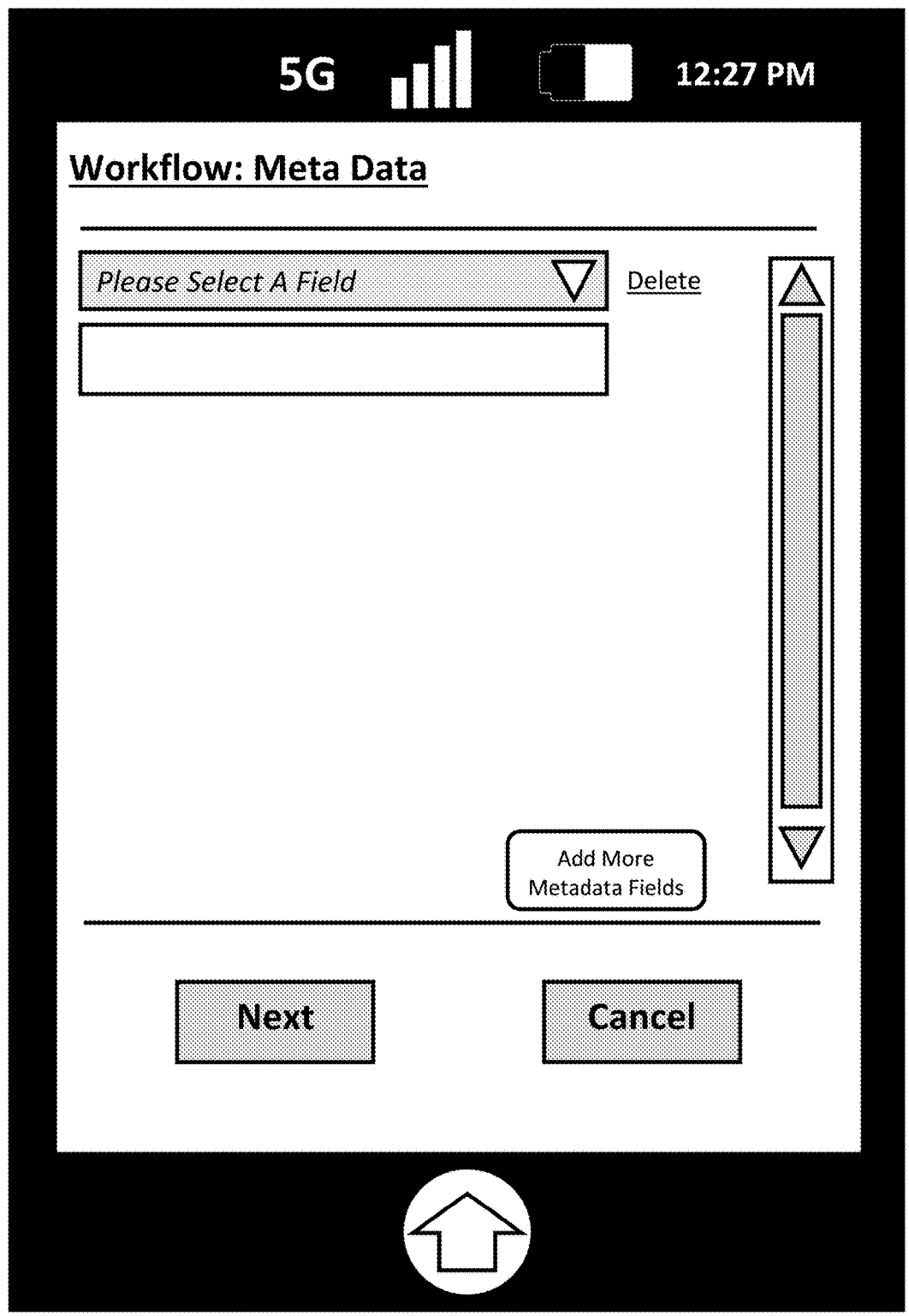
Figure 10C:
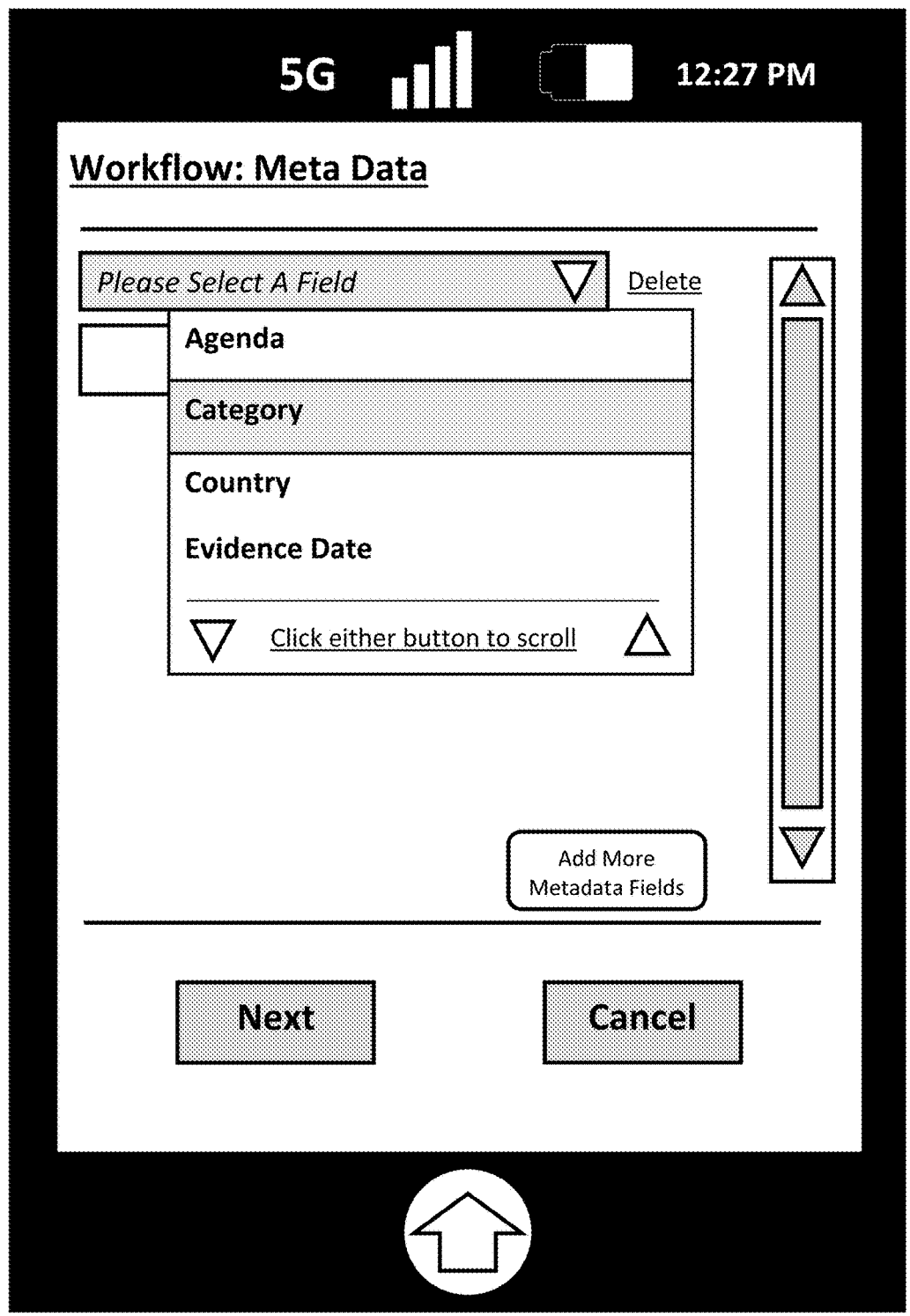

After the user has selected a naming convention for the content image, the user may be presented with a screen (FIG. 10B) for specifying or selecting a metadata field (step S902). A metadata field may be selected from a list of candidate fields (e.g., "Agenda", "Category", "Country", etc.), such as presented via a drop-down menu, such as shown in FIG. 10C. The user can scroll through the drop-down menu to select any of the candidate fields.

Figure 10D:
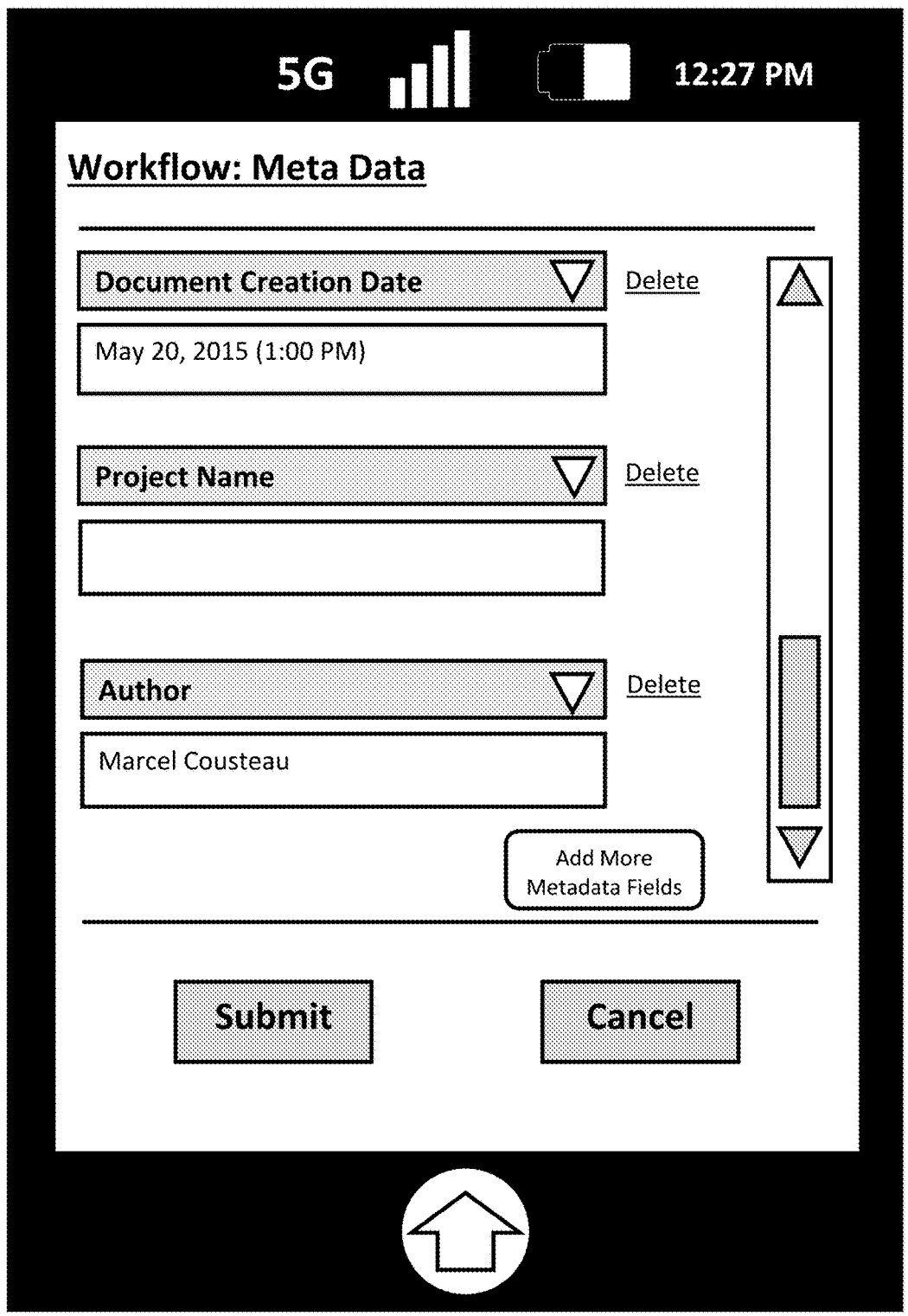
Figure 10E:
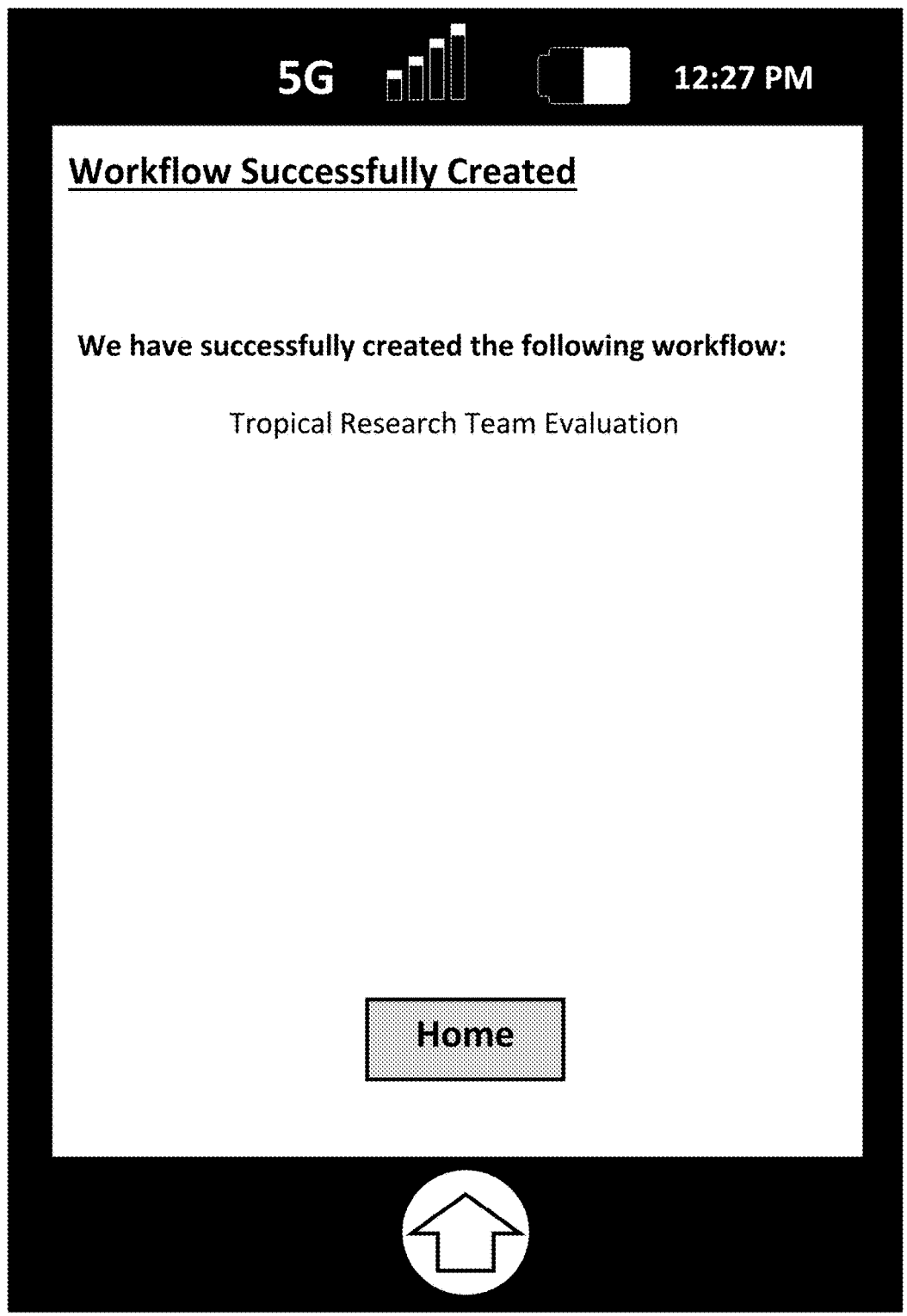

After receiving selection of a metadata field and input of corresponding metadata (S903), the content capture application determines whether the user wishes to add more fields (S904). In the case that the user wishes to add more metadata fields (step S904, Yes) by activating an "Add More Metadata Fields" option (S904, Yes), the process repeats (returns to S902) to permit the user to select another field to be added and specify corresponding metadata. Thus, the user has the option add as many metadata fields (in any order) as the user desires. It should be noted that the user can add metadata fields, but is not required to fill them in, as shown by way of example in FIG. 10D, in which "Project Name" was added as a field but no metadata was specified. Further, it should also be noted that the metadata field may be pre-filled after the user has selected a metadata field type. For example, the "Author" metadata field may be pre-filled with the user name. After the user does not want to add any more metadata fields (step S904, No), the content capture application generates the workflow (step S906), such as shown in FIG. 10E.

The orders in which the steps are performed in the aforementioned methods are not limited to those shown in the examples of FIGS. 6A, 6B, 6C and 9, and may be switched as long as similar results are achieved.

The aforementioned specific embodiments are illustrative, and many variations can be introduced on these embodiments without departing from the spirit of the disclosure or from the scope of the appended claims. For example, various aspects, features and advantages disclosed herein can be employed without the entire method or process shown in FIGS. 6A-6C. Further, although the aspects, features and advantages are discussed herein in connection with a mobile application, it should be understood that such aspects and feature may be integrated in a program that is not application software per se, but may be instead, for example, an operating system, a snap-in, a plug-in, an add-on, an extension, or another program not normally referenced as an application.

In addition, elements and/or features of different examples and illustrative embodiments may be combined with each other and/or substituted for each other within the scope of this disclosure and appended claims.

What is claimed is:

1. A content capture application including one or more programs of instructions embodied in a non-transitory computer readable medium and executable by a processor of a terminal apparatus to capture content, determine whether the terminal apparatus is connected to a content management apparatus having a capture-to-workflow feature, and upload via a network to the content management apparatus having the capture-to-workflow feature, wherein the content capture application, when executed, performs a method comprising:

(a) managing, by a network communication module of the content capture application, communications by the terminal apparatus through the network with the content management apparatus;

(b) capturing, by a content capture module of the content capture application, user-specified content into a content image, and upon capture of the content image, determining whether the terminal apparatus is connected to the content management apparatus; and (c) providing, by a user interface module of the content capture application, a login screen on a terminal display of the terminal apparatus to receive login information from a user for connecting to the content management apparatus, (d) maintaining, by the content capture application and in local storage of the terminal apparatus, a workflow cache of plural user interface workflows, each including one or more metadata screens, and performing, by the content capture application, upon the content capture module determining that the terminal apparatus is connected to the content management apparatus, a refresh operation to update the already cached user interface workflows maintained in the local storage of the terminal apparatus, with registered user interface workflows received from the content management apparatus, when the content capture module determines that the terminal apparatus is connected to the content management apparatus;

(e) providing, on the terminal display after the content capture application determines upon capture of the content image that the terminal apparatus is not connected to the content management apparatus, a user interface screen including a first option to select a cached workflow from a displayed list of the cached user interface workflows, and a second option to create a new cached workflow;

(e1) in response to user selection of the second option in the user interface screen provided in (e), providing one or more new metadata screens, capturing metadata entered via the new metadata screens, and registering the captured metadata and the new metadata screens thereof as the new cached workflow, amongst the plural user interface workflows, in the workflow cache stored in the local storage;

(e2) in response to user selection from the list of a cached workflow that includes metadata screens, from amongst the plural user interface workflows including the new cached workflow maintained in the cache workflow and created locally on the terminal apparatus, providing the metadata screens of the selected workflow on the terminal display to receive metadata from the user, updating one or more of the plural cached user interface workflows in the workflow cache to include the metadata entered by the user via the metadata screens of the selected workflow, and tracking the updated workflows in the workflow cache in the local storage; and (f) providing, on the terminal display when the terminal apparatus is connected to the content management apparatus after the new cached workflow is stored in the workflow cache in the local storage, a confirmation screen including the new cached workflow, to be submitted to the content management apparatus, and in response to user selection of the new cached workflow in the confirmation screen, a metadata confirmation screen showing the metadata associated with the new cached workflow, to permit editing of the metadata associated with the new cached workflow, prior to submitting the new cached workflow to the content management apparatus.

2. The content capture application as claimed in claim 1, wherein when the user selects, while the terminal apparatus is connected to the content management apparatus, a specified workflow from the user interface workflows maintained by the content management apparatus, the user interface module caches the metadata screens of the specified workflow in the workflow cache maintained in the local storage of the terminal apparatus.

3. The content capture application as claimed in claim 1, wherein when the terminal apparatus is connected to the content management apparatus after the cached workflow in the local storage is updated, the user interface module provides a user interface prompt indicating a number of the updated workflows cached in the local storage and prompting the user to submit the updated workflows to the content management apparatus for update of the user interface workflows maintained by the content management apparatus for the user.

4. The content capture application as claimed in claim 3, wherein the user interface prompt indicating the number of the updated workflows cached in the local storage of the terminal apparatus remains on the terminal display of the terminal apparatus until the user submits the updated workflows to the content management apparatus.

5. The content capture application as claimed in claim 1, wherein when the content capture application determines upon capture of the content image that the terminal apparatus is not connected to the content management apparatus, the content image is cached in the local storage of the terminal apparatus and when the terminal apparatus is thereafter connected to the content management apparatus and login by the user has been authenticated, the user interface module provides on the terminal display of the terminal apparatus a user interface prompt notifying the user of content images cached on the terminal apparatus and including a submit offline content images part to receive user instruction to submit the cached content images to the content management apparatus.

6. The content capture application as claimed in claim 5, wherein when the user selects the submit offline content images part of the user interface prompt, the user interface module provides on the terminal display of the terminal apparatus a content images confirmation screen displaying a list of the cached content images to be submitted and permitting the user to remove one or more content images from the list.

7. The content capture application as claimed in claim 5, wherein when the user selects the submit offline content images part of the user interface prompt, the user interface module provides on the terminal display of the terminal apparatus a content images confirmation screen displaying a list of the cached content images to be submitted and permitting the user to select one of the content images from the list, and upon user selection, provides a content images metadata confirmation screen showing the metadata associated with the selected content image and permitting the user to edit said metadata associated with the selected content image.

8. The content capture application as claimed in claim 5, wherein when the user selects the submit offline content images part of the user interface prompt when the terminal apparatus is thereafter connected to the content management apparatus, the user interface module provides on the terminal display of the terminal apparatus a content images edit metadata screen, to allow the user to determine whether the cached metadata associated with one of the cached content images includes errors or is incomplete, to permit the user to correct the errors in the metadata or to enter information missing in the incomplete metadata.

9. A content capture system including a capture-to-workflow feature and comprising:

a content management apparatus, including a storage device to register user interface workflows, each including one or more metadata screens, and to provide the user interface workflows selectively; and a terminal apparatus including local storage, a terminal display, a processor and a content capture application including one or more programs of instructions embodied in a non-transitory computer readable medium and executable by the processor to capture content, determine whether the terminal apparatus is connected to the content management apparatus and upload via a network to the content management apparatus, wherein the content capture application, when executed by the processor performs a method comprising:

(a) managing, by a network communication module of the content capture application, communications by the terminal apparatus through the network with the content management apparatus;

(b) capturing, by a content capture module of the content capture application, user-specified content into a content image, and upon capture of the content image, determining whether the terminal apparatus is connected to the content management apparatus;

(c) providing, by a user interface module of the content capture application, login screen on the terminal display to receive login information from a user for connecting to the content management apparatus;

(d) maintaining, by the content capture application and in local storage of the terminal apparatus, a workflow cache of plural user interface workflows each including one or more metadata screens, and performing, by the content capture application, upon the content capture module determining that the terminal apparatus is connected to the content management apparatus, a refresh operation to update the already cached user interface workflows maintained in the local storage of the terminal apparatus, with registered user interface workflows received from the content management apparatus, when the content capture module determines that the terminal apparatus is connected to the content management apparatus;

(e) providing by the user interface module on the terminal display after the content capture application determines upon capture of the content image that the terminal apparatus is not connected to the content management apparatus, a user interface screen including a first option to select a cached workflow from a displayed list of the cached user interface workflows, and a second option to create a new cached workflow;

(e1) in response to user selection of the second option in the user interface screen provided in (e), providing one or more new metadata screens, capturing metadata entered via the new metadata screens, and registering the captured metadata and the new metadata screens thereof as the new cached workflow, amongst the plural user interface workflows, in the workflow cache stored in the local storage;

(e2) in response to user selection of a cached workflow that includes metadata screens, from amongst the plural user interface workflows including the new cached workflow maintained in the cache workflow and created locally on the terminal apparatus, providing the metadata screens of the selected workflow on the terminal display to receive metadata from the user, updating one or more of the plural cached user interface workflows in the workflow cache to include the metadata entered by the user via the metadata screens of the selected workflow, and tracking the updated workflows in the workflow cache in the local storage; and (f) providing, on the terminal display when the terminal apparatus is connected to the content management apparatus after the new cached workflow is stored in the workflow cache in the local storage, a confirmation screen including the new cached workflow, to be submitted to the content management apparatus, and in response to user selection of the new cached workflow in the confirmation screen, a metadata confirmation screen showing the metadata associated with the new cached workflow, to permit editing of the metadata associated with the new cached workflow, prior to submitting the new cached workflow to the content management apparatus.

10. The content capture system as claimed in claim 9, wherein when the user selects, while the terminal apparatus is connected to the content management apparatus, a specified workflow from the user interface workflows maintained by the content management apparatus, the user interface module caches the metadata screens of the specified workflow in the workflow cache maintained in the local storage of the terminal apparatus.

11. The content capture system as claimed in claim 9, wherein when the terminal apparatus is connected to the content management apparatus after the cached workflow in the local storage is updated, the user interface module provides a user interface prompt indicating a number of the updated workflows cached in the local storage and prompting the user to submit the updated workflows to the content management apparatus for update of the user interface workflows maintained by the content management apparatus for the user.

12. The content capture system as claimed in claim 9, wherein the content management apparatus registers, for each authorized user amongst plural authorized users, one or more user interface workflows specific to the authorized user and retrievable by the authorized user upon login authentication of the user.

13. A capture-to-workflow method performed by a terminal apparatus that includes local storage, a terminal display and a processor and is configured to communicate through a network with a content management apparatus that registers user interface workflows, each including one or more metadata screens, and to provide the user interface workflows selectively, the method comprising:

(a) managing communications by the terminal apparatus through the network with the content management apparatus;

(b) providing a login screen on the terminal display to receive login information from a user for connecting to the content management apparatus;

(c) determining whether the terminal apparatus is connected to a content management apparatus;

(d) maintaining, by the content capture application and in local storage of the terminal apparatus, a workflow cache of plural user interface workflows each including one or more metadata screens, and performing, by the content capture application, upon determining that the terminal apparatus is connected to the content management apparatus, a refresh operation to update the already cached user interface workflows maintained in the local storage of the terminal apparatus, with registered user interface workflows received from the content management apparatus, when it is determined in (b) that the terminal apparatus is connected to the content management apparatus;

(e) capturing user-specified content into a content image, and after determining that the terminal apparatus is not connected to the content management apparatus upon capture of the content image, providing on the terminal display a user interface screen including a first option to select a cached workflow from a displayed list of the cached user interface workflows, and a second option to create a new cached workflow;

(e1) in response to user selection of the second option in the user interface screen provided in (e), providing one or more new metadata screens, capturing metadata entered via the new metadata screens, and registering the captured metadata and the new metadata screens thereof as the new cached workflow, amongst the plural user interface workflows, in the workflow cache stored in the local storage;

(e2) in response to user selection of a cached workflow that includes metadata screens, from amongst the plural user interface workflows including the new cached workflow maintained in the cache workflow and created locally on the terminal apparatus, providing the metadata screens of the selected workflow on the terminal display to receive metadata from the user, updating one or more of the plural cached user interface workflows in the workflow cache to include the metadata entered by the user via the metadata screens of the selected workflow, and tracking the updated workflows in the workflow cache in the local storage; and (f) providing, on the terminal display when the terminal apparatus is connected to the content management apparatus after the new cached workflow is stored in the workflow cache in the local storage is updated, a confirmation screen including the new cached workflow, to be submitted to the content management apparatus, and in response to user selection of the new cached workflow in the confirmation screen, a metadata confirmation screen showing the metadata associated with the new cached workflow, to permit editing of the metadata associated with the new cached workflow, prior to submitting the new cached workflow to the content management apparatus.

14. The method as claimed in claim 13, further comprising:

caching in the workflow cache maintained in the local storage of the terminal apparatus the metadata screens of a specified workflow selected, while the terminal apparatus is connected to the content management apparatus, by the user from the user interface workflows maintained by the content management apparatus.

15. The method as claimed in claim 13, further comprising:

providing, when the terminal apparatus is connected to the content management apparatus after the cached workflow in the local storage is updated, a user interface prompt indicating a number of the updated workflows cached in the local storage and prompting the user to submit the updated workflows to the content management apparatus for update of the user interface workflows maintained by the content management apparatus for the user.

* * * * *